United States Patent
Zhang et al.

(10) Patent No.: US 10,615,702 B2
(45) Date of Patent: Apr. 7, 2020

(54) POWER CONVERTER AND CONTROL METHOD THEREOF

(71) Applicant: DELTA ELECTRONICS (SHANGHAI) CO., LTD., Shanghai (CN)

(72) Inventors: Yu Zhang, Shanghai (CN); Haoyi Ye, Shanghai (CN); Jianhong Zeng, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 264 days.

(21) Appl. No.: 15/483,527

(22) Filed: Apr. 10, 2017

(65) Prior Publication Data

US 2017/0310227 A1  Oct. 26, 2017

(30) Foreign Application Priority Data

Apr. 20, 2016 (CN) .......................... 2016 1 0247799

(51) Int. Cl.
*H02M 3/337* (2006.01)
*H02M 1/00* (2006.01)

(52) U.S. Cl.
CPC .... *H02M 3/3374* (2013.01); *H02M 2001/007* (2013.01)

(58) Field of Classification Search
CPC ................. H02M 2001/007; H02M 3/3374
See application file for complete search history.

(56) References Cited

U.S. PATENT DOCUMENTS 7,479,769 B2 * 1/2009 Xu .................... H02M 3/158
                                            323/271
7,898,235 B2   3/2011 Seo
(Continued)

FOREIGN PATENT DOCUMENTS

CN      2554861 Y     6/2003
CN      1434560 A     8/2003
(Continued)

OTHER PUBLICATIONS

Kim, Bong-Chul et al., Adaptive Link Voltage Variation (ALVV) Control for High Power Density Adapter, Power Electronics Specialists Conference, Jun. 15-19, 2008, 1022-1027, IEEE, Rhodes, Greece.

*Primary Examiner* — Gary L Laxton
*Assistant Examiner* — Peter M Novak
(74) *Attorney, Agent, or Firm* — Kirton McConkie; Evan R. Witt

(57) ABSTRACT

A control method of a power converter including a first stage converter and a second stage converter is provided. The first stage converter converts an input voltage into an intermediate voltage. The second stage converter converts the intermediate voltage into an output voltage to power a load. If a loading amount of the load is larger than a first threshold value, the intermediate voltage is adjusted to increase a voltage difference between the intermediate voltage and the output voltage, so that a change of the intermediate voltage is in a negative correlation with a change of the loading amount. If the loading amount is smaller than a second threshold value, the intermediate voltage remains be unchanged or the intermediate voltage is adjusted, so that the change of the intermediate voltage is in positive correlation with the change of the loading amount.

25 Claims, 16 Drawing Sheets

(56) References Cited

U.S. PATENT DOCUMENTS

| | | | |
|---|---|---|---|
| 7,898,830 B1 | 3/2011 | Casey | |
| 8,344,710 B2* | 1/2013 | Sriram | H02M 3/28 |
| | | | 323/222 |
| 8,861,236 B2 | 10/2014 | Remmert | |
| 2005/0184713 A1 | 8/2005 | Xu | |
| 2007/0001653 A1 | 1/2007 | Xu | |
| 2010/0246220 A1* | 9/2010 | Irving | H02M 1/4225 |
| | | | 363/78 |
| 2011/0241569 A1 | 10/2011 | Zimmermann | |
| 2012/0155124 A1* | 6/2012 | Cheng | H02M 3/337 |
| | | | 363/24 |
| 2012/0169308 A1 | 7/2012 | Dearborn et al. | |
| 2014/0009970 A1 | 1/2014 | Brinlee et al. | |
| 2015/0171740 A1* | 6/2015 | Seong | H02M 1/4208 |
| | | | 320/162 |
| 2016/0079872 A1 | 3/2016 | Ryu | |
| 2017/0055322 A1* | 2/2017 | Jiang | H02M 3/07 |
| 2017/0117810 A1* | 4/2017 | Ghosh | H02M 1/4225 |
| 2017/0244318 A1* | 8/2017 | Giuliano | H02M 3/07 |
| 2017/0305298 A1* | 10/2017 | Takeshima | H02J 7/14 |

FOREIGN PATENT DOCUMENTS

| | | |
|---|---|---|
| CN | 1913319 A | 2/2007 |
| CN | 103715889 A | 4/2014 |
| WO | 14082943 A1 | 6/2014 |

\* cited by examiner

POWER CONVERTER AND CONTROL METHOD THEREOF

CROSS-REFERENCE TO RELATED APPLICATION

This application claims priority to China Patent Application No. 201610247799.3, filed on Apr. 20, 2016, the entire contents of which are incorporated herein by reference for all purposes.

FIELD OF THE DISCLOSURE

The present disclosure relates to a power converter and a control method thereof, and more particularly to a two-stage power converter and a control method thereof.

BACKGROUND OF THE DISCLOSURE

With increasing development of internet and communication technologies, the living styles of people are deeply changed. As the internet and communication technologies become more powerful, more powerful processors or large-scale integrated circuits are required to process data. However, since the processing capability for the processors or large-scale integrated circuits increase, the power consumption also increases. Therefore, it is important to increase the converting efficiency of the power converters of the processors or large-scale integrated circuits.

Conventionally, the method of powering the server system or the communication system provides a relatively lower bus voltage (e.g., 12V). Moreover, by a power converter, the low bus voltage is converted into regulated voltages for powering the processors or large-scale integrated circuits. As the power consumption of the processors or large-scale integrated circuits increase, the current withstood by the low voltage bus bar gradually increases. The power consumption of the bus bar is proportional to the square of the current on the bus bar. Without decreasing the wiring impedance of the bus bar, the power consumption of the bus bar increases with the square of the current. Consequently, the conventional method of powering the server system or the communication system wastes energy and generates a great deal of heat. The generation of heat decreases stability and reliability of the server system or the communication system.

For solving the above drawbacks, some approaches are disclosed. In accordance with an approach, a relatively higher voltage (e.g., 48V or more) is provided to the bus bar to centralize the efficacy of powering the server system or the communication system. In case that the load power is unchanged, the current for the bus bar applied by 48V bus voltage is one fourth of the current for the bus bar applied by 12V bus voltage, and thereby the power consumption corresponding to 48V bus voltage is one sixteenth of the power consumption corresponding to 12V bus voltage. Consequently, the use of the high bus voltage to power the server system or the communication system can largely reduce the power loss of the bus bar.

Generally, the power supply voltage of the processor or the large-scale integrated circuit is low. Consequently, if the voltage difference between the power supply voltage of the processor or the large-scale integrated circuit and the received bus voltage of the power converter is higher, the converting efficiency is lower. In case that the bus voltage is high, the converting efficiency of the two-stage power converter is superior to the converting efficiency of the single-stage power converter.

FIG. 1 is a schematic circuit diagram illustrating a conventional power converter. As shown in FIG. 1, the power converter 1 is for example a two-stage power converter and comprises a first stage converter 10 and a second stage converter 11. The first stage converter 10 receives an input voltage $V_{in}$ (e.g., a bus voltage) with a higher magnitude (e.g., 48V) and converts the input voltage $V_{in}$ into an intermediate voltage $V_{mid}$. The second stage converter 11 receives the intermediate voltage $V_{mid}$ and converts the intermediate voltage $V_{mid}$ into an output voltage $V_{out}$. The output voltage $V_{out}$ is used for powering a load 12 such as a processor or a large-scale integrated circuit.

In the conventional method of controlling the second stage converter 11 of the power converter 1, the output voltage $V_{out}$ is only used as the parameter to be controlled. However, since the output voltage $V_{out}$ is the only parameter to be controlled, the converting efficiency of the second stage converter 11 is not surely optimized in all possible load conditions (e.g., a light load condition or a heavy load condition) while achieving the output feature. The problem of the first stage converter 10 is similar to the problem of the second stage converter 11. That is, the converting efficiency of the first stage converter 10 is not surely optimized in all possible load conditions.

Therefore, there is a need of providing a power converter and a control method in order to overcome the above drawbacks.

SUMMARY OF THE DISCLOSURE

An object of the present disclosure provides a power converter and a control method of the power converter in order to overcome the drawbacks encountered by the prior art and to optimize the converting efficiency of the power converter in various load conditions.

An object of the present disclosure provides a power converter and a control method of the power converter.

In accordance with an aspect of the present disclosure, there is provided a method of controlling a power converter having a first stage converter and a second stage converter. The method includes the following steps. Firstly, an input voltage is converted into an intermediate voltage. Then, the intermediate voltage is converted into an output voltage and the output voltage is provided to a load. Thereafter, a loading amount of the load is detected. If the loading amount of the load is larger than a first threshold value, the intermediate voltage is adjusted to increase a voltage difference between the intermediate voltage and the output voltage, so that a change of the intermediate voltage is negatively correlated with a change of the loading amount of the load. If the loading amount of the load is smaller than a second threshold value, keep the intermediate voltage unchanged or adjust the intermediate voltage, so that the change of the intermediate voltage is positively correlated with the change of the loading amount of the load within at least a loading change range. The first threshold value is larger than the second threshold value.

In accordance with another aspect of the present disclosure, there is provided a power converter. The power converter includes a first stage converter, a second stage converter and a first control circuit. The first stage converter receives an input voltage and converts the input voltage into an intermediate voltage. The second stage converter receives and converts the intermediate voltage into an output voltage and provides the output voltage to a load. The first control circuit is electrically coupled with the first stage converter, and includes a sampling circuit and a mode-selecting circuit. The sampling circuit is electrically coupled with an input terminal of the first stage converter and an output terminal of the second stage converter. The sampling circuit samples signals of the input voltage and signals responding to an output current of the second stage converter and generates a first reference voltage according to the output current and the input voltage. The mode-selecting circuit receives the first reference voltage, determines a load condition of the load according to the first reference voltage and adjusts a working mode of the first stage converter according to the load condition.

In accordance with a further aspect of the present disclosure, there is provided a power converter. The power converter includes a first stage converter and a second stage converter. The first stage converter receives an input voltage and converts the input voltage into an intermediate voltage. The second stage converter receives and converts the intermediate voltage into an output voltage and provides the output voltage to a load. The first stage converter is a resonant DC/DC converter, and the resonant DC/DC converter includes a resonant inductor and a transformer having a primary winding and a secondary winding. A terminal of the primary winding is electrically coupled with a second terminal of the resonant inductor. $H=L_m/L_r$, wherein $L_m$ is an inductance value of an equivalent inductor of the primary winding of the transformer, $L_r$ is an inductance value of the resonant inductor, and H is in a range between 10 and 100.

The above contents of the present disclosure will become more readily apparent to those ordinarily skilled in the art after reviewing the following detailed description and accompanying drawings, in which:

DETAILED DESCRIPTION

The present disclosure will now be described more specifically with reference to the following embodiments. It is to be noted that the following descriptions of preferred embodiments of this disclosure are presented herein for purpose of illustration and description only. In the following embodiments and drawings, the elements irrelevant to the concepts of the present disclosure are omitted and not shown.

Figure 1:
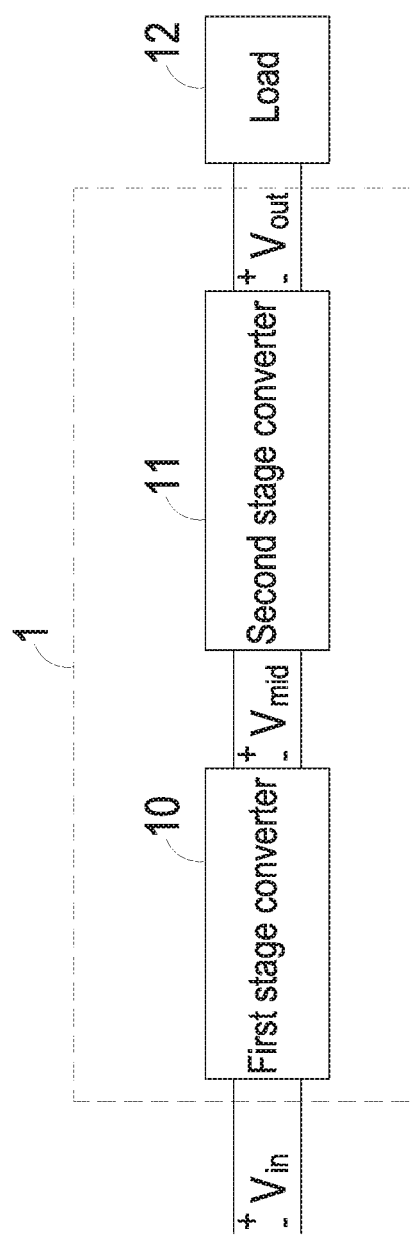
FIG. 1 is a schematic circuit diagram illustrating a conventional power converter.

The present disclosure provides a power converter and a control method thereof. The power converter includes a first stage converter and a second stage converter. After the power loss of the second stage converter was analyzed, it was found that the converting efficiency of the second stage converter is optimized in different load conditions by adjusting the intermediate voltage from the first stage converter. The operations of the power converter will be illustrated as follows. The power converter of FIG. 1 can be applied to the power converter of the present disclosure. As shown in FIG. 1, the power converter 1 comprises the first stage converter 10 and the second stage converter 11. After the intermediate voltage $V_{mid}$ from the first stage converter 10 is received by the second stage converter 11, the intermediate voltage $V_{mid}$ is converted into the output voltage $V_{out}$ by the second stage converter 11 and the output voltage $V_{out}$ is provided to the load 12. In other words, the converting efficiency of the second stage converter 11 is related to the intermediate voltage $V_{mid}$ and the load 12. In case that the second stage converter 11 is a DC/DC converter, the circuitry of the second stage converter 11 comprises switches, storage elements and connectors. The storage elements include inductive storage elements and capacitive storage elements. During operations of these components, an energy loss problem occurs. The total energy loss of the second stage converter 11 is divided into conduction loss, switching loss, driving loss and core loss. The relationship between the total energy loss, the conduction loss, the switching loss, the driving loss and the core loss can be expressed by the following mathematic formula (1):

$$P_{total2}(V_{mid}, i_{o1}, i_{o2}, f) = P_{cond2}(i_{o1}, i_{o2}) + P_{s2}(f) + P_{drv2}(f) + P_{core2}(V_{mid}) \quad (1)$$

In the mathematic formula (1), $P_{total2}$ is the total energy loss of the second stage converter 11, $V_{mid}$ is the received intermediate voltage of the second stage converter 11, $i_{o1}$ is the intermediate current from the first stage converter 10 and received by the second stage converter 11, $i_{o2}$ is the output current from the second stage converter 11, f is the switching frequency of the switch element of the second stage converter 11, $P_{cond2}$ is the conduction loss of the second stage converter 11, $P_{s2}$ is the switching loss of the switch element of the second stage converter 11, $P_{drv2}$ is the driving loss of the second stage converter 11, and $P_{core2}$ is the core loss of the second stage converter 11. The conduction loss $P_{cond2}$ of the second stage converter 11 contains the conduction loss caused by the received intermediate current $i_{o1}$ of second stage converter and the conduction loss caused by the output current $i_{o2}$ of the second stage converter 11. The relationship between the conduction loss $P_{cond2}$ of the second stage converter 11, the conduction loss caused by the received intermediate current $i_{o1}$ of second stage converter 11 and the conduction loss caused by the output current $i_{o2}$ of the second stage converter 11 can be expressed by the following mathematic formula (2):

$$P_{cond2}(i_{o1}, i_{o2}) = R_{in2} i_{o1}^2 + R_{o2} i_{o2}^2 \quad (2)$$

In the mathematic formula (2), $R_{in2}$ is the equivalent input resistance of the second stage converter 11, and $R_{o2}$ is the equivalent output resistance of the second stage converter 11.

Moreover, the core loss is positively correlated with the received intermediate voltage $V_{mid}$ of the second stage converter 11, and the conduction loss is positively correlated with the output current $i_{o2}$ of the second stage converter 11 and negatively correlated with the intermediate voltage $V_{mid}$. After the change of the energy loss is analyzed, the following results are obtained. If the intermediate voltage $V_{mid}$ is unchanged and the load 12 is in the light load condition, the core loss takes the largest fraction of the total energy loss. Whereas, if the load 12 is in the heavy load condition, the conduction loss takes the largest fraction of the total energy loss. According to a control strategy, the received intermediate voltage $V_{mid}$ of the second stage converter 11 is increased when the load 12 is in the heavy load condition. Consequently, the conduction loss is decreased. Although the core loss is increased, the increase of the core loss is smaller than the decrease of the conduction loss. Under this circumstance, the total energy loss of the second stage converter 11 is decreased with the increasing intermediate voltage $V_{mid}$. According to another control strategy, the received intermediate voltage $V_{mid}$ of the second stage converter 11 is decreased when the load 12 is in the light load condition. Consequently, the core loss is decreased. Although the conduction loss is increased, the increase of the conduction loss is smaller than the decrease of the core loss. Under this circumstance, the total energy loss of the second stage converter 11 is also decreased with the decreasing intermediate voltage $V_{mid}$.

Figure 2:
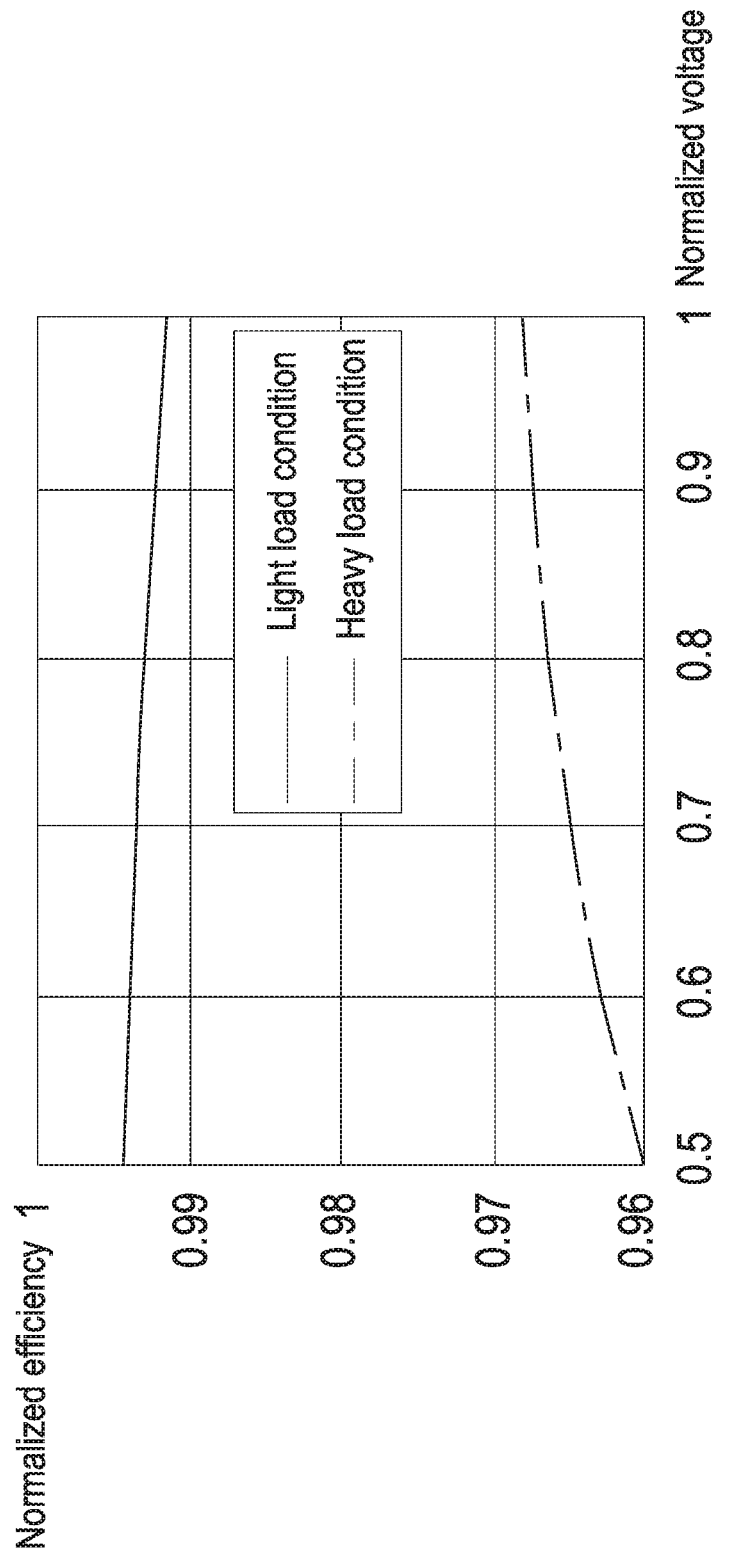
FIG. 2 is a plot illustrating the relationship between the normalized efficiency and the normalized intermediate voltage of the second stage converter of the power converter in different load conditions.

FIG. 2 is a plot illustrating the relationship between the normalized efficiency and the normalized intermediate voltage of the second stage converter of the power converter in different load conditions. Please refer to FIGS. 1 and 2. When the load 12 is in the light load condition, the converting efficiency of the second stage converter 11 is decreased with the increasing intermediate voltage $V_{mid}$. When the load 12 is in the heavy load condition, the converting efficiency of the second stage converter 11 is increased with the increasing intermediate voltage $V_{mid}$. In accordance with the control method of the present disclosure, the intermediate voltage $V_{mid}$ is adaptively adjusted according to the load amount of the load 12. Consequently, the converting efficiency of the second stage converter 11 is optimized.

Figure 3:
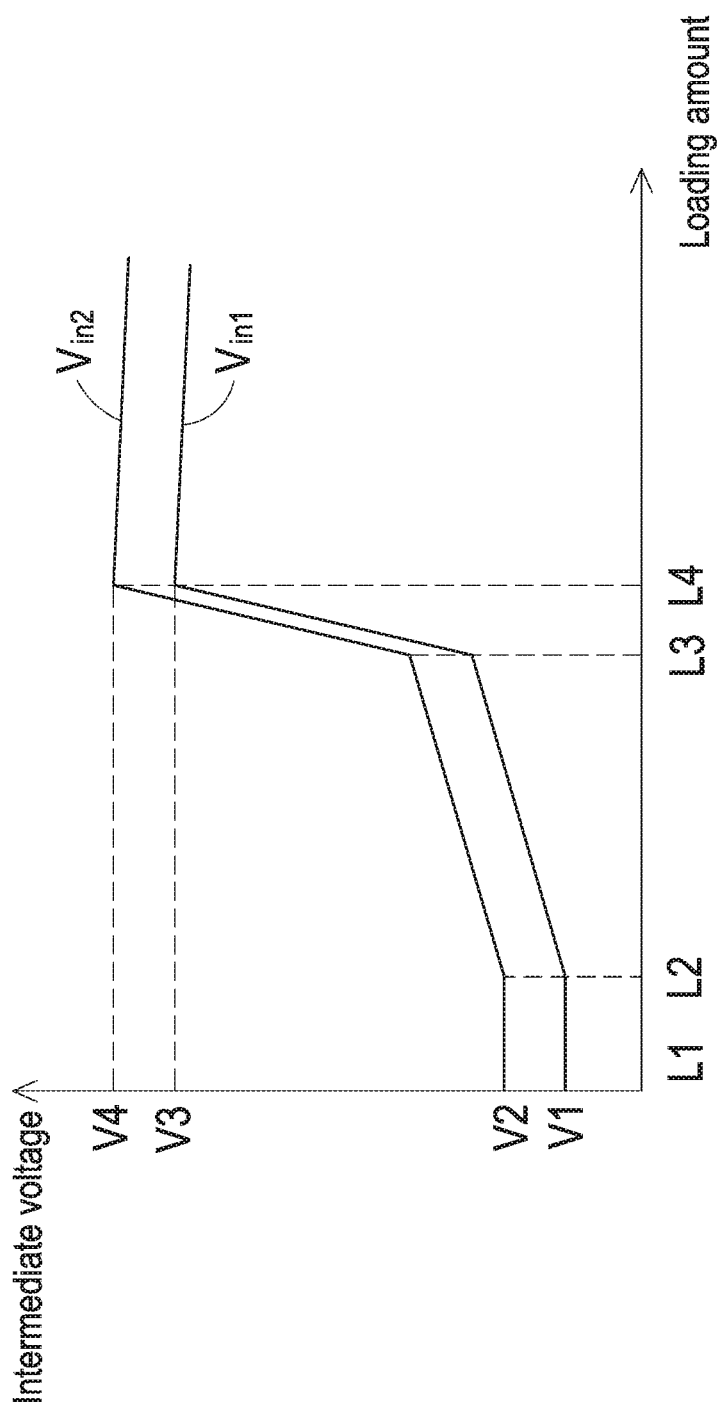
FIG. 3 schematically illustrates the relationship between the received intermediate voltage of the second stage converter of the power converter and the loading amount of the load by a control method according to a first embodiment of the present disclosure.

FIG. 3 schematically illustrates the relationship between the received intermediate voltage of the second stage converter of the power converter and the loading amount of the load by a control method according to a first embodiment of the present disclosure. In FIG. 3, the horizontal axis indicates the change of the loading amount of the load 12, and the vertical axis indicates the magnitude of the intermediate voltage $V_{mid}$. The curves $V_{in1}$ and $V_{in2}$ indicate the input voltages received by the first stage converter 10 in different conditions. The control method of the present disclosure includes the following steps. Firstly, the loading amount of the load 12 is detected. If the loading amount L4 of the load 12 is larger than a first threshold value, the load 12 is in a heavy load condition. In the heavy load condition, the intermediate voltage $V_{mid}$ from the first stage converter 10 is adjusted to increase the voltage difference between the intermediate voltage $V_{mid}$ and the output voltage $V_{out}$. Consequently, the conduction loss of the second stage converter 11 is decreased, and the converting efficiency of the second stage converter 11 in the heavy load condition is optimized. If the loading amount L3 of the load 12 is smaller than a second threshold value, the load 12 is in a light load condition. In the light load condition, the intermediate voltage $V_{mid}$ from the first stage converter 10 is adjusted to decrease the voltage difference between the intermediate voltage $V_{mid}$ and the output voltage $V_{out}$. Consequently, the core loss of the second stage converter 11 is decreased, and the converting efficiency of the second stage converter 11 in the light load condition is optimized.

More especially, the relationship between the loading amount of the load 12 and the intermediate voltage $V_{mid}$ can be expressed by the following mathematic formula: $V_{mid} = a \times i_{o1} + b$. In this mathematic formula, the $V_{mid}$ is the received intermediate voltage of the second stage converter 11, and $i_{o1}$ is the received intermediate current of the second stage converter 11. Moreover, the coefficient "a" is a slope of the line between the intermediate voltage $V_{mid}$ and the loading amount of the load 12 in the heavy load condition. Generally, the coefficient "a" is determined according to the internal resistance of the first stage converter 10. The coefficient "b" is determined according to the received input voltage $V_{in}$ of the first stage converter 10. Generally, $b = V_{in}/n$, wherein $V_{in}$ is the input voltage, and n is the turn ratio between the primary side and the secondary side of a transformer of the first stage converter 10. When the load 12 is in the heavy load condition, coefficient "a" is negative. For example, $-0.2 \le a < 0$. When the load 12 is in the light load condition, coefficient "a" is positive. For example, $0 \le a < 1$.

Figure 4:
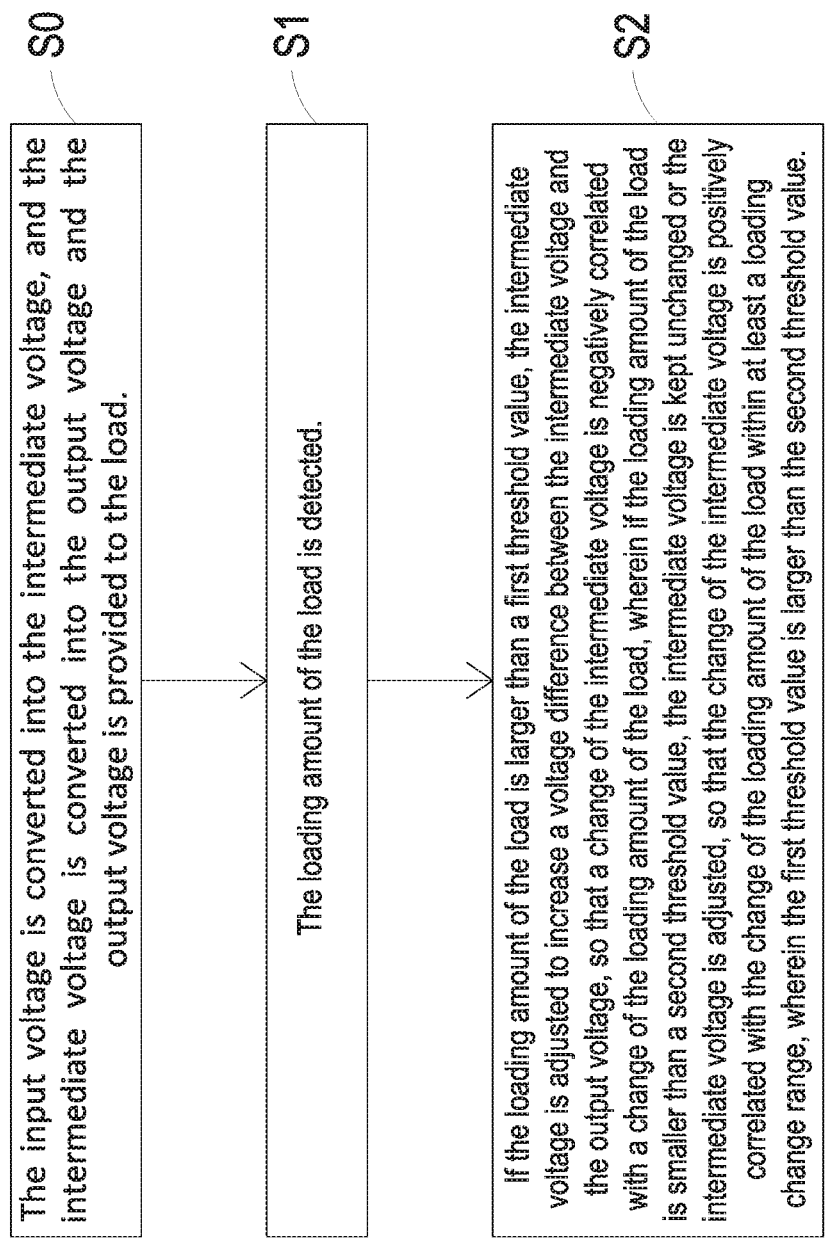
FIG. 4 is a flowchart illustrating a control method of the power converter according to an embodiment of the present disclosure.

FIG. 4 is a flowchart illustrating a control method of the power converter according to an embodiment of the present disclosure. Firstly, in a step S0, the input voltage $V_{in}$ is converted into the intermediate voltage $V_{mid}$, and the intermediate voltage $V_{mid}$ is converted into the output voltage $V_{out}$ and the output voltage $V_{out}$ is provided to the load 12. Then, in a step S1, a loading amount of the load 12 is detected. Thereafter, in a step S2, the intermediate voltage $V_{mid}$ from the first stage converter 10 is adjusted according to the detecting result. If the loading amount of the load 12 is larger than a first threshold value, the intermediate voltage $V_{mid}$ is adjusted to increase a voltage difference between the intermediate voltage $V_{mid}$ and the output voltage $V_{out}$, so that a change of the intermediate voltage $V_{mid}$ is in a negative correlation with a change of the loading amount of the load 12. For example, the change of the intermediate voltage $V_{mid}$ and the change of the loading amount of the load 12 are in a negative linear correlation with a slope in a range between −0.2 and 0. If the loading amount of the load 12 is smaller than a second threshold value, the intermediate voltage is kept unchanged or the intermediate voltage is adjusted, so that the change of the intermediate voltage $V_{mid}$ is in a positive correlation with the change of the loading amount of the load 12 within at least a loading change range. For example, the change of the intermediate voltage $V_{mid}$ and the change of the loading amount of the load 12 are in a positive linear correlation with a slope in a range between 0 and 1. The first threshold value is larger than the second threshold value.

In the step S1, the load 12 is determined to be in a light load condition or a heavy load condition according to the result of judging whether the loading amount of the load 12 is larger than the first threshold value or whether the loading amount of the load 12 is smaller than the second threshold value. If the loading amount of the load 12 is larger than the first threshold value, it means that the load 12 is in the heavy load condition. If the loading amount of the load 12 is smaller than the second threshold value, it means that the load 12 is in the light load condition. In some embodiments, the loading amount of the load 12 in the light load condition is smaller than 30% of the rated loading amount (e.g., 20%, 10% or 5% of the rated loading amount), and the loading amount of the load 12 in the heavy load condition is larger than 50% of the rated loading amount (e.g., 70% or 90% of the rated loading amount).

The step S2 further comprises a sub-step. If the loading amount of the load 12 is a range between the first threshold value (corresponding to heavy load condition) and the second threshold value (corresponding to light load condition), the intermediate voltage $V_{mid}$ from the first stage converter 10 is adjusted to increase at a predetermined increase ratio with the increasing loading amount of the load 12. Please refer to FIG. 3 again. When the loading amount of the load 12 is in the range between the loading amount L3 and the loading amount L4, the intermediate voltage $V_{mid}$ from the first stage converter 10 is adjusted to increase at a predetermined increase ratio with the increasing loading amount of the load 12.

If the load 12 is in the heavy load condition (e.g., the loading amount of the load 12 is larger than the loading amount L4), the intermediate voltage $V_{mid}$ is adjusted to increase a voltage difference between the intermediate voltage $V_{mid}$ and the output voltage $V_{out}$. As the loading amount of the load 12 is continuously increased, the intermediate voltage $V_{mid}$ is continuously decreased. In other words, at the moment when the load 12 enters the heavy load condition, the intermediate voltage $V_{mid}$ has the maximum value. Consequently, the converting efficiency of the first stage converter 10 is optimized.

In case that the first stage converter 10 has a pulse width modulation circuitry configuration, the first stage converter 10 works in a pulse width modulation (PWM) mechanism. In case that the first stage converter 10 has a resonant circuitry configuration, the first stage converter 10 works in a resonant circuit topology. That is, the way of adjusting the intermediate voltage $V_{mid}$ from the first stage converter 10 is determined according to the circuitry configuration and the operating method of the first stage converter 10. In case that the first stage converter 10 works in the pulse width modulation mechanism and the load 12 is in the heavy load condition, the first stage converter 10 works according to a pulse width modulation signal, which is received by the first stage converter 10 and has the highest duty ratio. In case that the first stage converter 10 works in the frequency modulation mechanism and the load 12 is in the heavy load condition, the first stage converter 10 works at a resonant frequency. When the load 12 is in the heavy load condition, the intermediate voltage $V_{mid}$ has the maximum value because the converting efficiency of the first stage converter 10 is optimized. Consequently, the output impedance of the first stage converter 10 has the feature of the natural internal resistor. That is, as the required current of the load 12 is increased, the intermediate voltage $V_{mid}$ is gradually decreased. Moreover, the intermediate voltage $V_{mid}$ from the first stage converter 10 and the received input voltage of the first stage converter 10 are in a proportional relation. The proportional coefficient is negative. As shown in FIG. 3, the voltages $V_3$ and $V_4$ are the highest intermediate voltages corresponding to the received input voltages $V_{in1}$ and $V_{in2}$ of the first stage converter 10. If the first stage converter 10 works in the frequency modulation mechanism, the voltages $V_3$ and $V_4$ are the intermediate voltages from the first stage converter 10 when the first stage converter 10 works at the resonant frequency. If the first stage converter 10 works in the pulse width modulation mechanism, the voltages $V_3$ and $V_4$ are the intermediate voltages from the first stage converter 10 when the pulse width modulation signal received by the first stage converter 10 has the highest duty ratio.

If the load 12 is in the light load condition (e.g., the loading amount of the load 12 is smaller than the loading amount L3), the intermediate voltage $V_{mid}$ is adjusted to decrease the voltage difference between the intermediate voltage $V_{mid}$ and the output voltage $V_{out}$. Consequently, the change of the intermediate voltage $V_{mid}$ is in positive correlation with the change of the loading amount of the load 12. However, the received intermediate voltage $V_{mid}$ of the second stage converter 11 has a lowest limit. For example, the intermediate voltage $V_{mid}$ is at least 1.1 times the output voltage $V_{out}$. Consequently, if the load 12 is in the light load condition and the loading amount of the load 12 is decreased to a third threshold value (i.e. the loading amount L2), which is smaller than the second threshold value, the intermediate voltage $V_{mid}$ is no longer changed with the loading amount of the load 12 (see FIG. 3). That is, the intermediate voltage $V_{mid}$ is kept unchanged. Consequently, the received intermediate voltage $V_{mid}$ of the second stage converter 11 is at least 1.1 times the output voltage $V_{out}$. As shown in FIG. 3, the intermediate voltage $V_{mid}$ is fixed when the loading amount of the load 12 is in the range between the loading amount L1 and the loading amount L2. In the step S2 of FIG. 4, if the loading amount of the load 12 is smaller than the second threshold value (e.g., the loading amount of the load 12 is in the range between the loading amount L2 and the loading amount L3), the intermediate voltage $V_{mid}$ is adjusted to decrease the voltage difference between the intermediate voltage $V_{mid}$ and the output voltage $V_{out}$ or the intermediate voltage $V_{mid}$ remains be unchanged (e.g., the loading amount of the load 12 is in the range between the loading amount L1 and the loading amount L2). If the load 12 is in the light load condition and the intermediate voltage $V_{mid}$ is no longer changed with the loading amount of the load 12, the first stage converter 10 and the second stage converter 11 work in the pulse width modulation mechanism. Under this circumstance, the intermediate voltage $V_{mid}$ is controlled to be the lowest limit of the intermediate voltage $V_{mid}$ within the loading change range (e.g., 1.1 times the output voltage $V_{out}$). Consequently, the second stage converter 11 runs at the highest duty ratio. If the load 12 is in the light load condition and the intermediate voltage $V_{mid}$ is no longer changed with the loading amount of the load 12, the first stage converter 10 works in the frequency modulation mechanism. Under this circumstance, the first stage converter 10 works at the highest resonant frequency. In practice, when the intermediate voltage $V_{mid}$ is decreased to the specified value and no longer changed with the loading amount of the load 12, the intermediate voltage $V_{mid}$ may have different values according to the input voltages. Please refer to FIG. 3 again. When the received input voltage of the first stage converter 10 is $V_{in1}$, the lowest limit of the intermediate voltage $V_{mid}$ is $V_1$. When the received input voltage of the first stage converter 10 is $V_{in2}$, the lowest limit of the intermediate voltage $V_{mid}$ is $V_2$. Moreover, if the first stage converter 10 works in the frequency modulation mechanism, the voltage $V_1$ or $V_2$ is the intermediate voltage $V_{mid}$ when the first stage converter 10 works at the highest resonant frequency. Moreover, if the first stage converter 10 works in the pulse width modulation mechanism, the voltage $V_1$ or $V_2$ is the intermediate voltage $V_{mid}$ when the pulse width modulation signal received by the first stage converter 10 has the lowest duty ratio.

Figure 5:
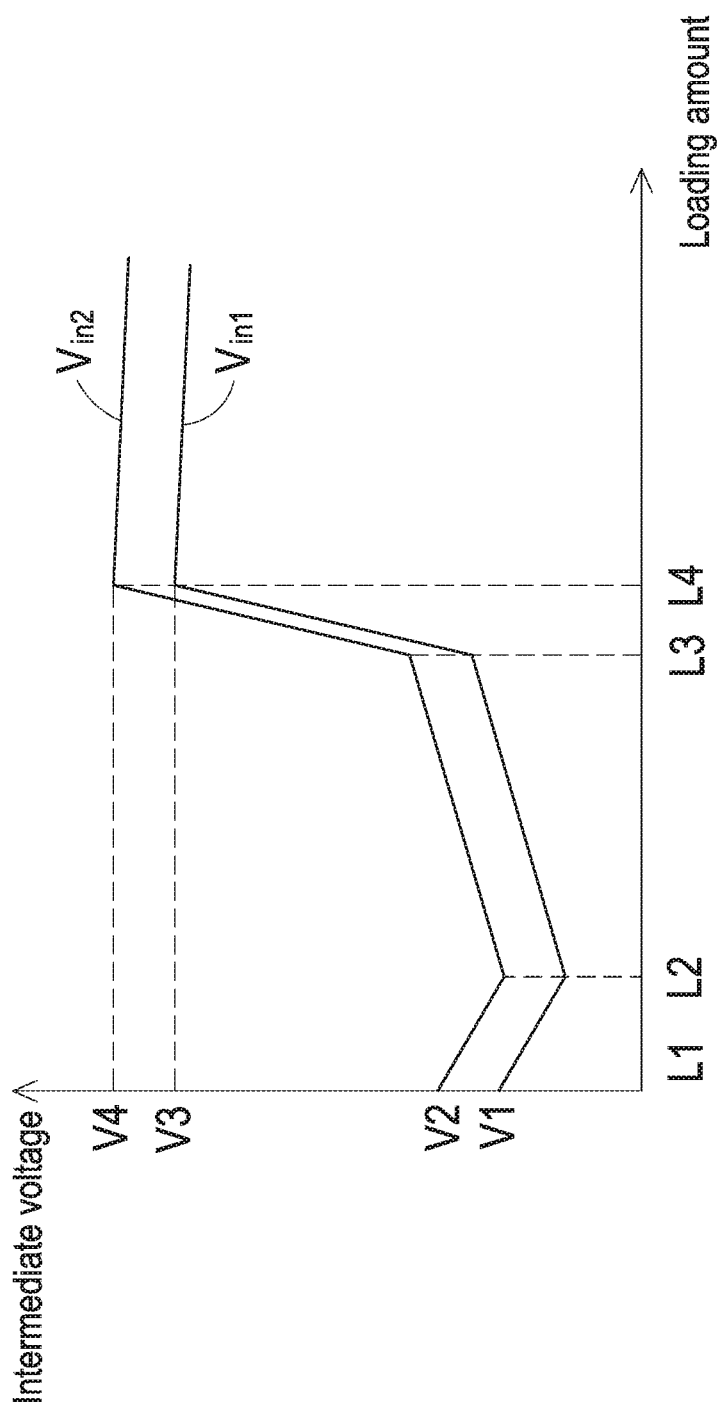
FIG. 5 schematically illustrates the relationship between the received intermediate voltage of the second stage converter of the power converter and the loading amount of the load by a control method according to a second embodiment of the present disclosure.

FIG. 5 schematically illustrates the relationship between the received intermediate voltage of the second stage converter of the power converter and the loading amount of the load by a control method according to a second embodiment of the present disclosure. Please refer to FIG. 5. If the load 12 is in the light load condition and the loading amount of the load 12 is decreased to loading amount L2, which is smaller than the third threshold value, the intermediate voltage $V_{mid}$ is increased with the decreasing loading amount of the load 12 (see FIG. 5). That is, the change of the intermediate voltage $V_{mid}$ and the change of the loading amount of the load 12 are in a negative linear correlation with a slope in a range between −1 and 0. Regardless of the change of the intermediate voltage $V_{mid}$, when the load 12 is in the light load condition and the loading amount of the load 12 is smaller than the third threshold value, the intermediate voltage $V_{mid}$ is at least 1.1 times the output voltage $V_{out}$. Consequently, the second stage converter 11 can be normally operated at high converting efficiency.

Figure 6:
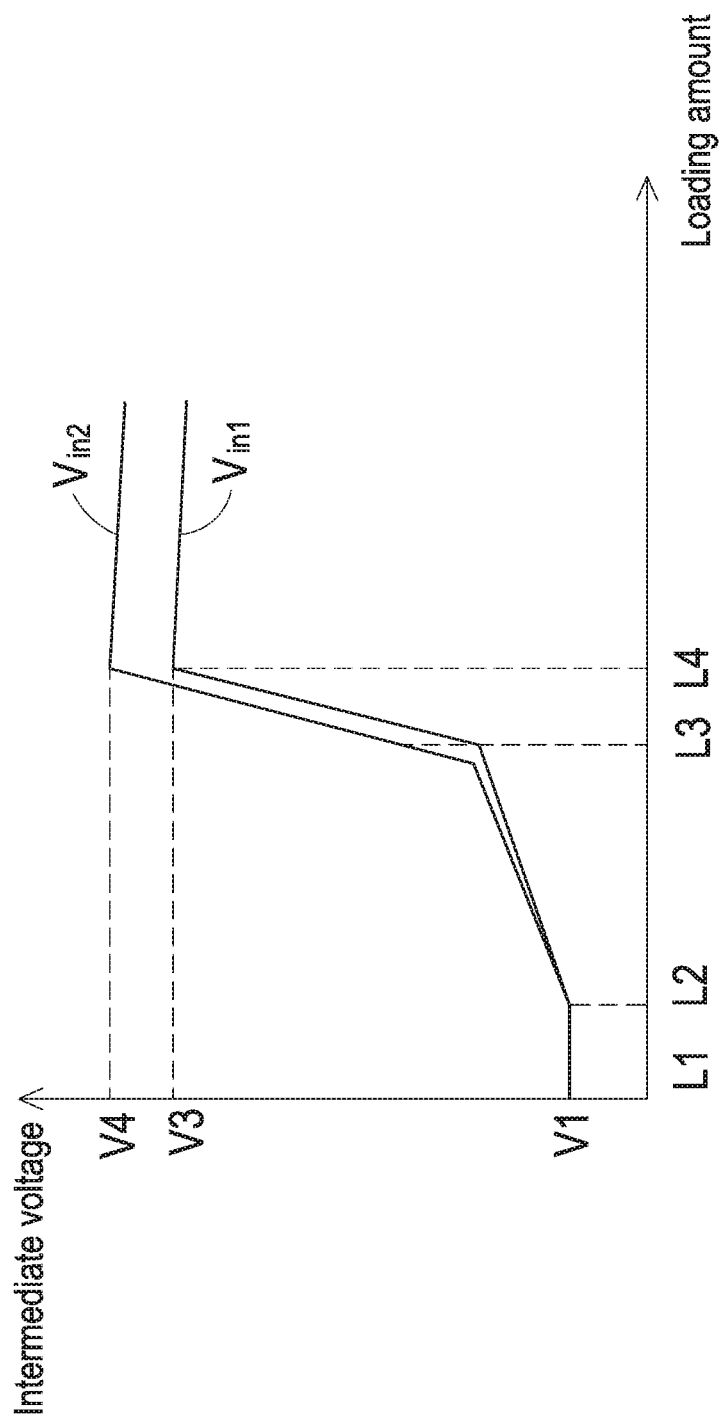
FIG. 6 schematically illustrates the relationship between the received intermediate voltage of the second stage converter of the power converter and the loading amount of the load by a control method according to a third embodiment of the present disclosure.

FIG. 6 schematically illustrates the relationship between the received intermediate voltage of the second stage converter of the power converter and the loading amount of the load by a control method according to a third embodiment of the present disclosure. Please refer to FIG. 6. If the load 12 is in the light load condition and the loading amount of the load 12 is decreased to loading amount L2, which is smaller than the third threshold value, the intermediate voltage $V_{mid}$ is maintained at a fixed value (e.g., the voltage $V_1$ as shown in FIG. 6). That is, regardless of whether the received input voltage of the first stage converter 10 is $V_{in1}$, $V_{in2}$ or another value, the intermediate voltage $V_{mid}$ is maintained at $V_1$. In other words, if the load 12 is in the light load condition and the loading amount of the load 12 is smaller than the third threshold value, the intermediate voltage $V_{mid}$ is maintained at the fixed value and is not related to the received input voltage of the first stage converter 10. Of course, for allowing the second stage converter 11 to be normally operated at high converting efficiency, the intermediate voltage $V_{mid}$ is at least 1.1 times the output voltage $V_{out}$.

Figure 7:
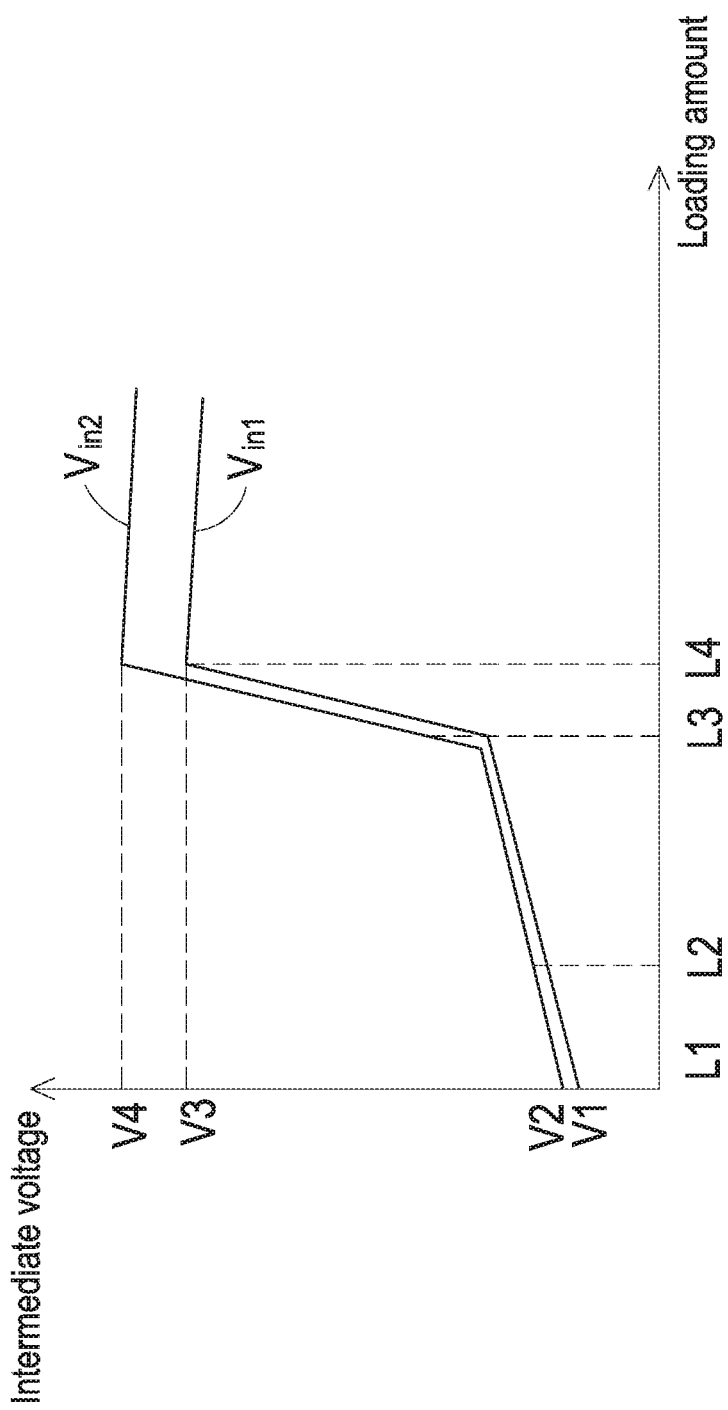
FIG. 7 schematically illustrates the relationship between the received intermediate voltage of the second stage converter of the power converter and the loading amount of the load by a control method according to a fourth embodiment of the present disclosure.

FIG. 7 schematically illustrates the relationship between the received intermediate voltage of the second stage converter of the power converter and the loading amount of the load by a control method according to a fourth embodiment of the present disclosure. Please refer to FIG. 7. If the load 12 is in the light load condition and the loading amount of the load 12 is decreased to loading amount L2, which is smaller than the third threshold value, the intermediate voltage $V_{mid}$ is decreased with the decreasing loading amount of the load 12. That is, the change of the intermediate voltage $V_{mid}$ is in positive correlation with the change of the loading amount of the load 12. Of course, for allowing the second stage converter 11 to be normally operated at high converting efficiency, the intermediate voltage $V_{mid}$ is at least 1.1 times the output voltage $V_{out}$.

Figure 8:
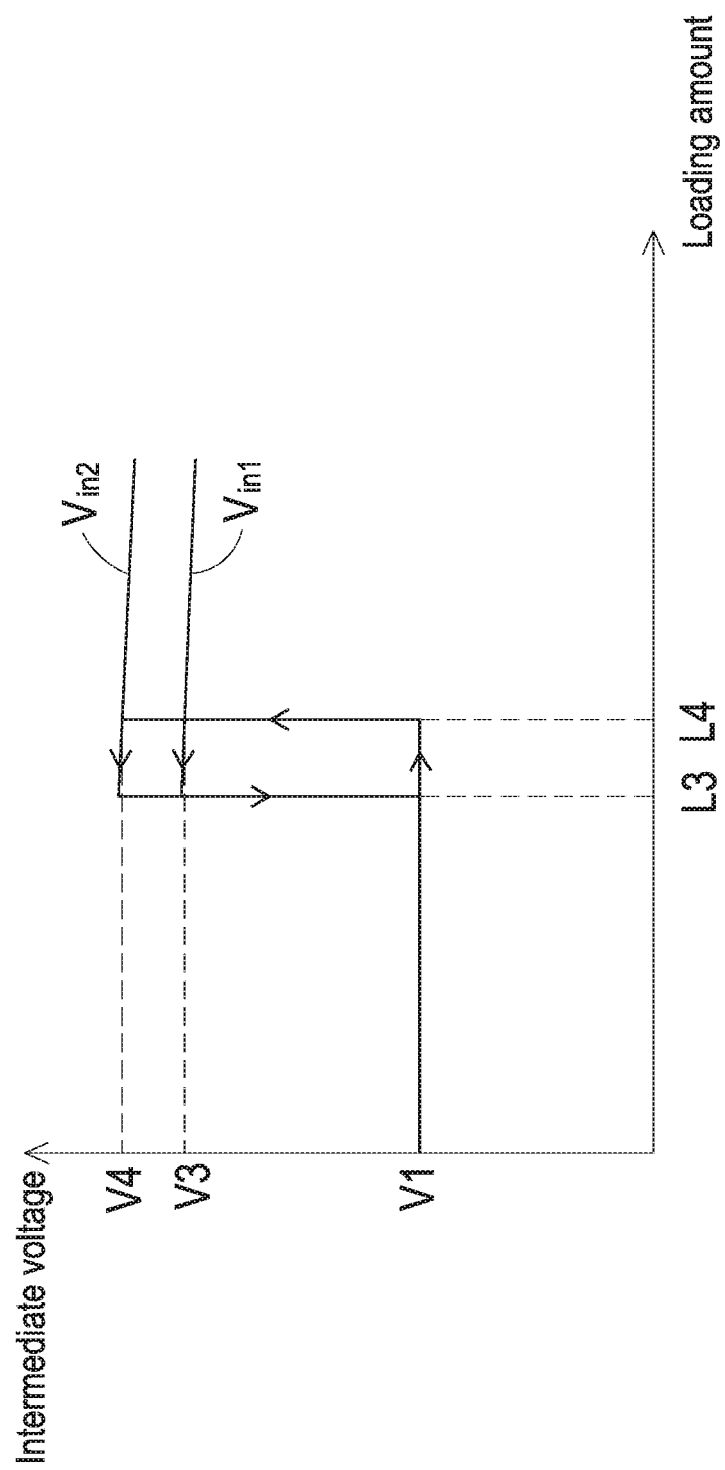
FIG. 8 schematically illustrates the relationship between the received intermediate voltage of the second stage converter of the power converter and the loading amount of the load by a control method according to a fifth embodiment of the present disclosure.

FIG. 8 schematically illustrates the relationship between the received intermediate voltage of the second stage converter of the power converter and the loading amount of the load by a control method according to a fifth embodiment of the present disclosure. Please refer to FIG. 8. For preventing the loading amount of the load 12 from fluctuating between the threshold of the light load condition and the threshold of the heavy load condition, there is a hysteresis loop between the light load condition (e.g., the loading amount L3) and the heavy load condition (e.g., the loading amount L4). Consequently, the power converter 1 can be normally operated. Moreover, for allowing the second stage converter 11 to be normally operated at high converting efficiency, the intermediate voltage $V_{mid}$ with the fixed value $V_1$ is at least 1.1 times the output voltage $V_{out}$.

For achieving the optimized converting efficiency of the power converter 1, it is preferred that the second stage converter 11 has the optimized converting efficiency in various load conditions and the first stage converter 10 has the optimized converting efficiency. In some embodiments, the control method of the present disclosure further controls the first stage converter 10 to achieve the optimized converting efficiency of the first stage converter 10. The operating principle of controlling the first stage converter 10 of the power converter 1 will be illustrated as follows.

Figure 9:
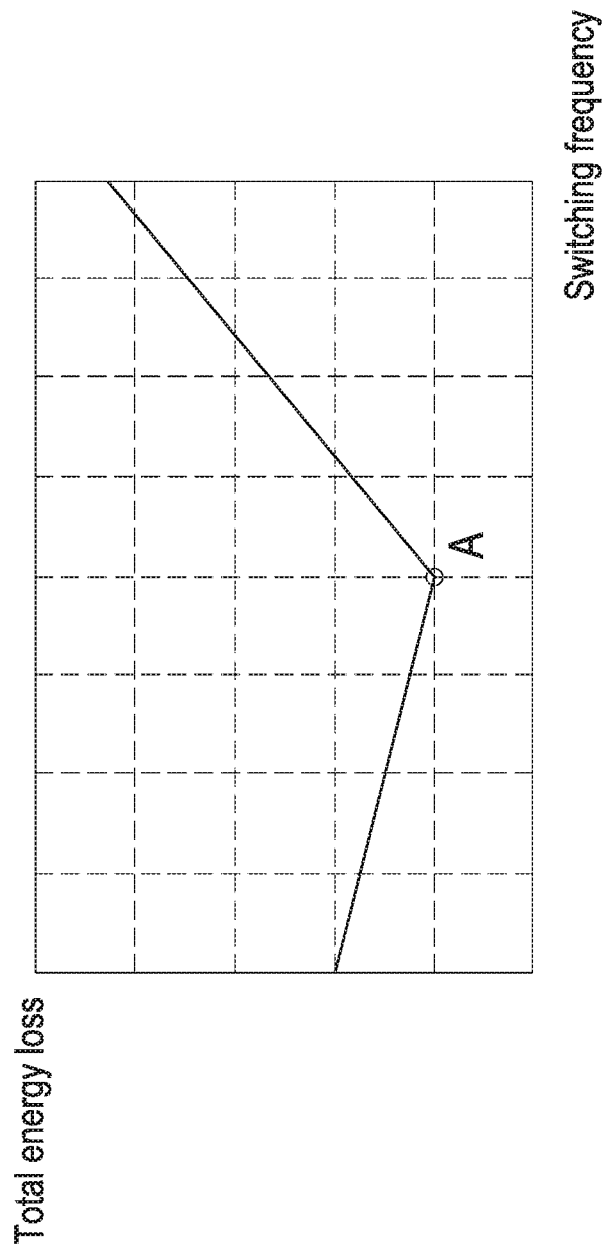
FIG. 9 is a plot illustrating the relationship between the total energy loss and the switching frequency of the first stage converter of the power converter.
Figure 10:
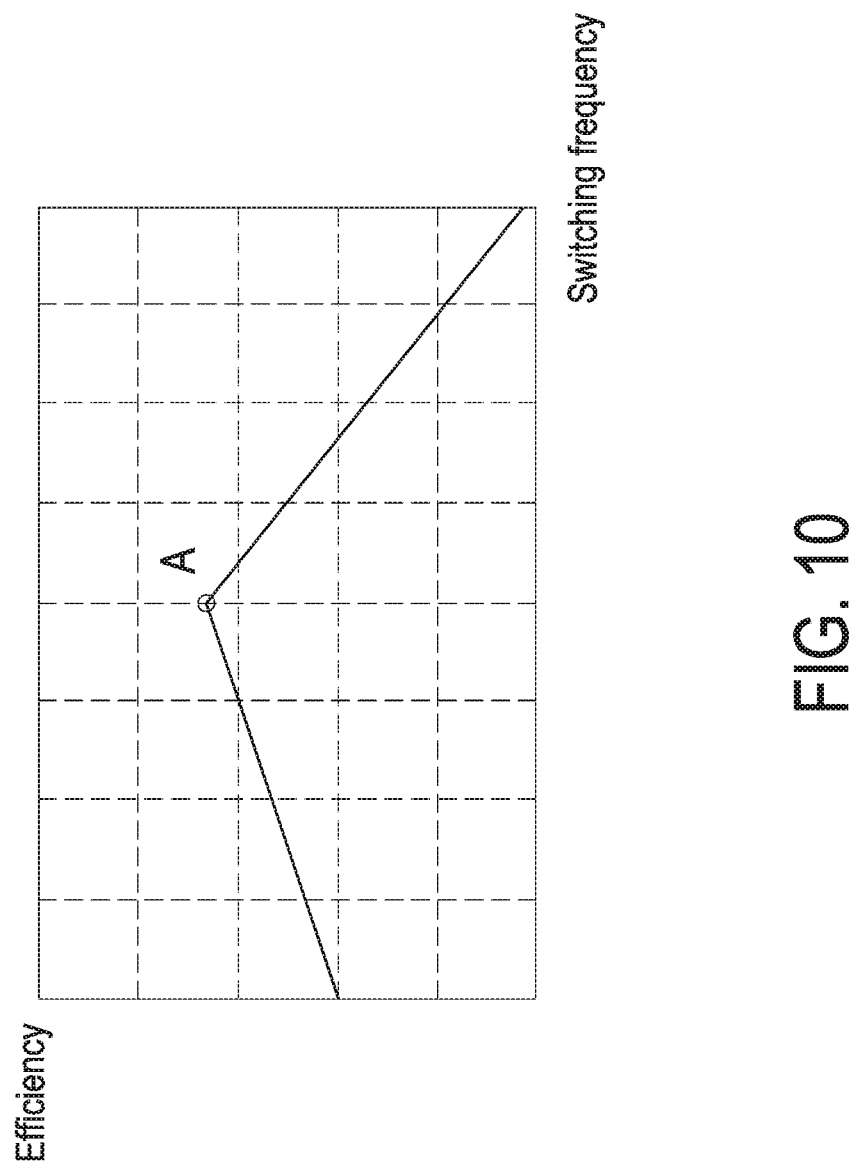
FIG. 10 is a plot illustrating the relationship between the converting efficiency and the switching frequency of the first stage converter of the power converter.

FIG. 9 is a plot illustrating the relationship between the total energy loss and the switching frequency of the first stage converter of the power converter. FIG. 10 is a plot illustrating the relationship between the converting efficiency and the switching frequency of the first stage converter of the power converter. The circuitry of the first stage converter 10 comprises switch elements, storage elements and connectors. The switch elements include inductive storage elements and capacitive storage elements. During operations of these components, an energy loss problem occurs. The total energy loss of the first stage converter 10 is divided into conduction loss, switching loss, driving loss and core loss. The relationship between the total energy loss, the conduction loss, the switching loss, the driving loss and the core loss can be expressed by the following mathematic formula:

$$I_{rms1}(f, p_0) \tag{3}$$

$$P_{cond1}(f, p_0) = I_{rms1}(f, p_0)^2 \times R_1 \tag{4}$$

$$P_{total1}(f, p_0) = P_{cond1}(f, p_0) + P_{s1}(f) + P_{drv1}(f) + P_{core1}(f) \tag{5}$$

$$P_{s1}(f) = E_{off1} \tag{6}$$

$$\eta_1(f, p_0) = p_0/(P_{total1}(f, p_0) + p_0) \tag{7}$$

In the above formulae, $I_{rms1}$ is the effective working current of the first stage converter 10, f is the switching frequency of the switch element of the first stage converter 10, $p_0$ is the output power of the first stage converter 10, $P_{cond1}$ is the conduction loss of the first stage converter 10, $R_1$ is the on resistance of the wire of the first stage converter 10, $P_{total1}$ is the total energy loss of the first stage converter 10, $P_{s1}$ is the switching loss of the switch element of the first stage converter 10, $P_{drv1}$ is the driving loss of the first stage converter 10, $P_{core1}$ is the core loss of the first stage converter 10, $E_{off1}$ is the energy loss of a single switching action of the first stage converter 10, and $\eta_1$ is the converting efficiency of the first stage converter 10. Please refer to the formula (3). In case that the input voltage $V_{in}$ is fixed, the effective working current of the first stage converter 10 is determined according to the switching frequency and the output power. Please refer to the formula (4). When the switching frequency is lower than a frequency A corresponding to the optimized converting efficiency, the effective working current is increased with the decreasing switching frequency. The increase of the effective working current may increase the conduction loss. Please refer to the formula (6). The energy loss of the single switching action of the switch element is constant. Consequently, the switching loss of the switch element is decreased with the decreasing switching frequency, the core loss is decreased with the decreasing switching frequency, and the conduction loss is increased with the decreasing switching frequency. Moreover, the increase of the conduction loss is larger than the decrease of the switching loss and the decrease of the core loss. Please refer to the left plane of FIG. 9. When the switching frequency is lower than the frequency A corresponding to the optimized converting efficiency, the total energy loss of the first stage converter 10 is decreased with the decreasing switching frequency.

Please refer to the formulae (4)~(7). When the switching frequency is higher than the frequency A corresponding to the optimized converting efficiency, the effective working current is increased with the increasing switching frequency. The increase of the effective working current may increase the conduction loss. Moreover, the energy loss of the single switching action of the switch element is increased with the increasing switching frequency. Consequently, the switching loss of the switch element is increased with the increasing switching frequency, and the core loss is increased with the increasing switching frequency. Please refer to the right plane of FIG. 9. When the switching frequency is higher than the frequency A corresponding to the optimized converting efficiency, the total energy loss of the first stage converter 10 is increased with the decreasing switching frequency. Moreover, according to the relationship between the total energy loss of the first stage converter 10 and the switching frequency of the switch element of the first stage converter 10 (see FIG. 9), the relationship between the converting efficiency of the first stage converter 10 and the switching frequency of the switch element of the first stage converter 10 can be obtained (see FIG. 10). In other words, as the switching frequency of the switch element of the first stage converter 10 is changed, the frequency A corresponding to the optimized converting efficiency is obtained.

If the first stage converter 10 works in a frequency modulation mechanism, the first stage converter 10 is firstly operated at a predetermined frequency. In a specified load condition, there is an inflection point between the converting efficiency and the switching frequency of the first stage converter 10 (see FIG. 10). According to differential calculus on the formula (7), the derivative of $d\eta_1(f,po)/df$ is calculated to acquire the frequency A corresponding to the optimized converting efficiency. For example, if $\eta_1(f,po)/df>0$, the predetermined frequency is increased. Consequently, the converting efficiency of the first stage converter 10 is gradually optimized. Moreover, if $d\eta_1(f,po)/df<0$, the predetermined frequency is decreased. Consequently, the converting efficiency of the first stage converter 10 is gradually optimized.

That is, the first stage converter 10 firstly works in a frequency modulation mechanism, and then the first stage converter 10 is operated at the predetermined frequency to output the intermediate voltage $V_{mid}$. Then, the intermediate voltage $V_{mid}$ is adjusted according to the load condition of the load 12. Consequently, the converting efficiency of the second stage converter 11 is increased. Then, the switching frequency of the first stage converter 10 is gradually changed, and differential operation for converting efficiency of the first stage converter 10 is performed. If the converting efficiency of the first stage converter 10 is higher than a predetermined reference value, the value of the switching frequency of the first stage converter 10 is stopped changing. If the converting efficiency of the first stage converter 10 is lower than the predetermined reference value and the derivative is positive, the switching frequency is increased and the first stage converter 10 is operated at the increased switching frequency. If the converting efficiency of the first stage converter 10 is lower than the predetermined reference value and the derivative is negative, the switching frequency is decreased and the first stage converter 10 is operated at the decreased switching frequency. Consequently, the converting efficiency of the first stage converter 10 is gradually optimized.

In some embodiments, the first stage converter 10 works in the pulse width modulation mechanism. The first stage converter 10 is firstly operated at a predetermined duty ratio to output the intermediate voltage $V_{mid}$. Then, the intermediate voltage $V_{mid}$ is adjusted according to the load condition of the load 12. Consequently, the converting efficiency of the second stage converter 11 is increased. Then, the value of the duty ratio is gradually changed, and differential operation for converting the converting efficiency of the first stage converter is performed. If the converting efficiency of the first stage converter 10 is higher than a predetermined reference value, the value of the duty ratio of the first stage converter 10 is stopped changed. If the converting efficiency of the first stage converter 10 is lower than the predetermined reference value and the derivative is positive, the duty ratio is increased and the first stage converter 10 is operated at the increased duty ratio. If the converting efficiency of the first stage converter 10 is lower than the predetermined reference value and the derivative is negative, the duty ratio is decreased and the first stage converter 10 is operated at the decreased duty ratio. Consequently, the converting efficiency of the first stage converter 10 is gradually optimized.

Moreover, if the load 12 is in the light load condition, the intermediate voltage $V_{mid}$ is adjusted to decrease the voltage difference between the intermediate voltage $V_{mid}$ and the output voltage $V_{out}$. Moreover, the method of adjusting the intermediate voltage $V_{mid}$ may be performed in a burst mode manner or a trajectory control manner.

Figure 11:
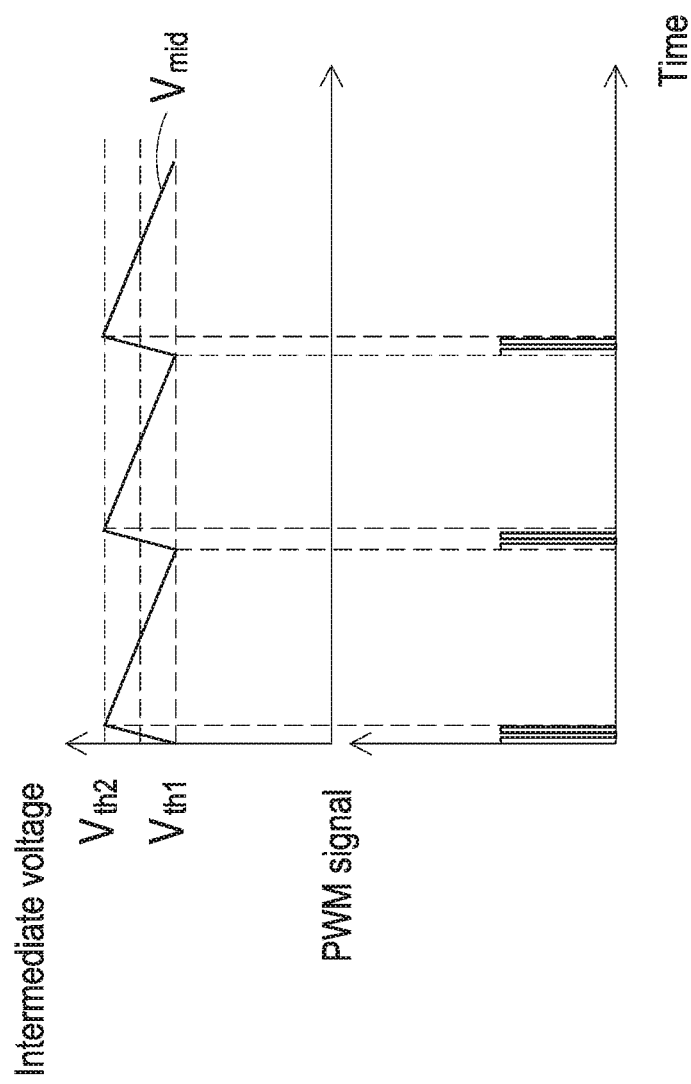
FIG. 11 is a schematic timing waveform diagram illustrating the intermediate voltage and the received pulse width modulation signal of the first stage converter when the intermediate voltage is adjusted in a burst mode manner.

FIG. 11 is a schematic timing waveform diagram illustrating the intermediate voltage and the received pulse width modulation signal of the first stage converter when the intermediate voltage is adjusted in a burst mode manner. In this embodiment, the first stage converter 10 has the pulse width modulation circuitry configuration, and the first stage converter 10 works in the pulse width modulation mechanism. If the load 12 is in the light load condition, the intermediate voltage $V_{mid}$ is adjusted in the burst mode manner. That is, when the intermediate voltage $V_{mid}$ reaches a low limit voltage $V_{th1}$ (i.e. lower limit threshold), the pulse width modulation signal is provided to the first stage converter 10. If the load 12 is in the light load condition, and when the intermediate voltage $V_{mid}$ reaches an upper limit voltage $V_{th2}$ (i.e. upper limit threshold), the pulse width modulation signal is stopped providing to the first stage converter 10. In such way, the intermediate voltage $V_{mid}$ is adjusted in the burst mode manner. Consequently, when the load 12 is in the light load condition, the converting efficiency of the first stage converter 10 is increased. The time interval from the generation of the pulse width modulation signal to the generation of the next pulse width modulation signal is referred as a burst cycle.

If the load 12 is in the light load condition and the first stage converter 10 works according to a normal pulse width modulation signal, the duty ratio is gradually increased to increase the intermediate voltage $V_{mid}$. Consequently, the procedure of switching the intermediate voltage $V_{mid}$ from the light load condition to the heavy load condition is completed. If the load 12 is in the light load condition and the first stage converter 10 is controlled in the burst mode manner, the burst frequency is increased to short the burst cycle, and the intermediate voltage $V_{mid}$ is gradually increased. Consequently, the procedure of switching the intermediate voltage $V_{mid}$ from the light load condition to the heavy load condition is completed.

Figure 12:
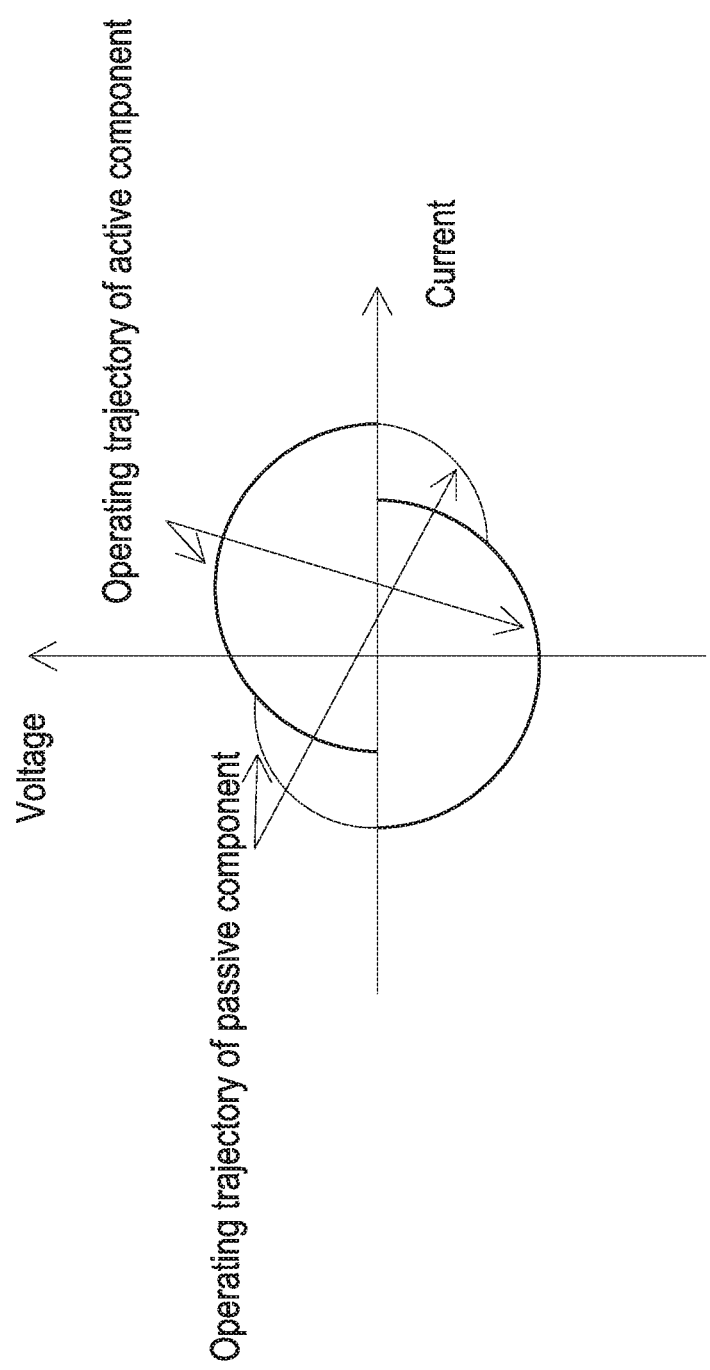
FIG. 12 is plot illustrating the voltage-current trajectory of active components and passive components of the first stage converter when the load is in the light load condition and the intermediate voltage is adjusted in a trajectory control manner.

FIG. 12 is plot illustrating the voltage-current trajectory of active components and passive components of the first stage converter when the load is in the light load condition and the intermediate voltage is adjusted in a trajectory control manner. Regardless of the circuitry configuration of the first stage converter 10 of the power converter 1, if the load 12 is in the light load condition, the intermediate voltage $V_{mid}$ can be adjusted in a trajectory control manner. That is, the active components and passive components of the first stage converter 10 have their voltage-current trajectories. If the load 12 is in the light load condition, the first stage converter is controlled to work according to a predetermined trajectory so as to adjust the intermediate voltage. The predetermined trajectory is used to configure the predetermined voltage-current trajectories of the active components and passive components of the first stage converter 10. Since the trajectory control manner is usually applied to other switching circuits, the detailed descriptions thereof are omitted.

Figure 13:
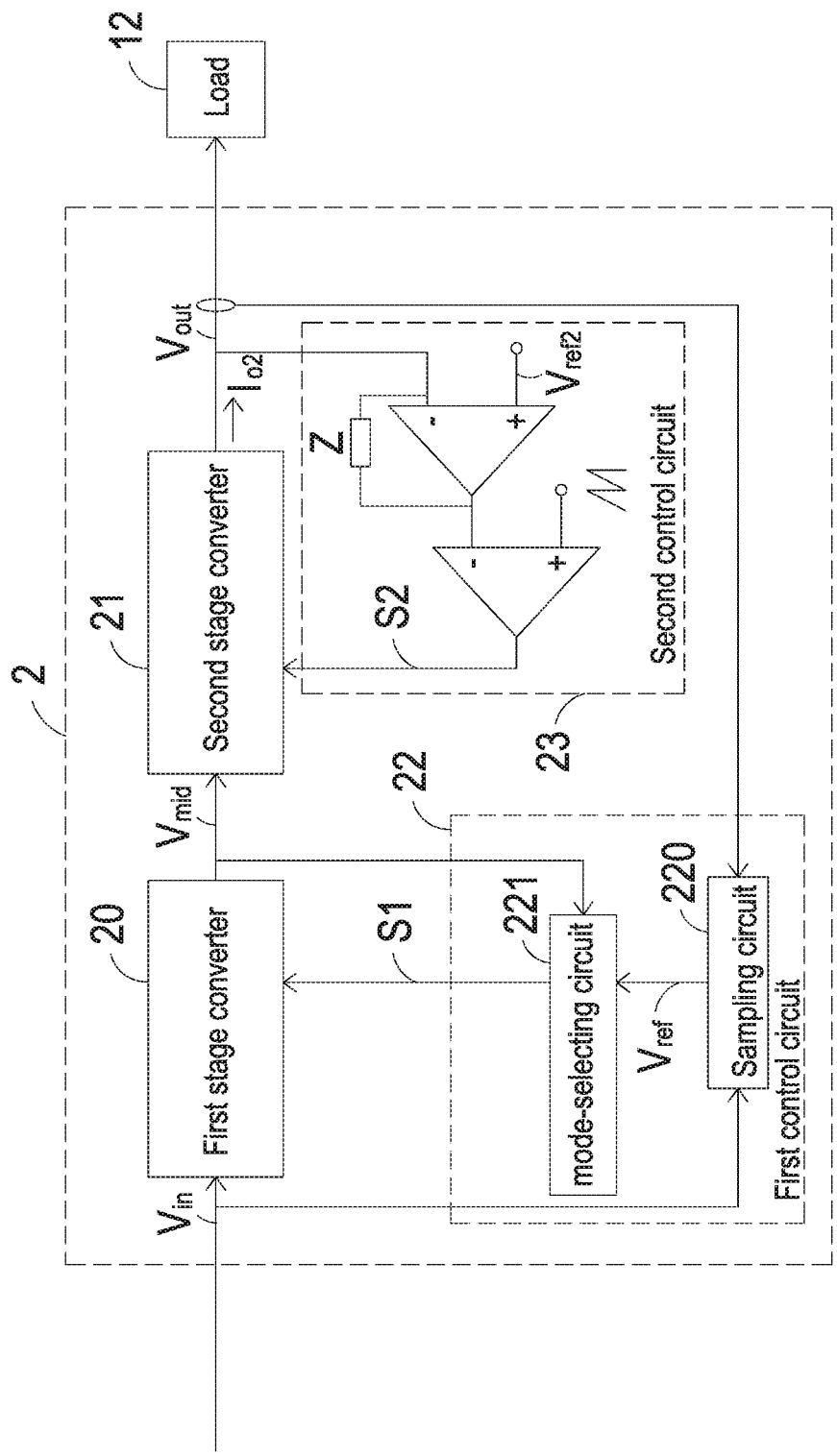
FIG. 13 is a schematic circuit diagram of a power converter according to an embodiment of the present disclosure.

FIG. 13 is a schematic circuit diagram of a power converter according to an embodiment of the present disclosure. As shown in FIG. 13, the power converter 2 comprises a first stage converter 20, a second stage converter 21 and a first control circuit 22. The first stage converter 20 receives an input voltage $V_{in}$ and converts the input voltage $V_{in}$ into an intermediate voltage $V_{mid}$. The second stage converter 21 receives and converts the intermediate voltage $V_{mid}$ into an output voltage $V_{out}$, and the output voltage $V_{out}$ is provided to the load 12. The first control circuit 22 is electrically coupled with the first stage converter 20. In this embodiment, the first control circuit 22 comprises a sampling circuit 220 and a mode-selecting circuit 221. The sampling circuit 220 is electrically coupled with an input terminal of the first stage converter 20 and an output terminal of the second stage converter 21. The sampling circuit 220 is used for sampling the signals of the input voltage $V_{in}$ and the signals responding to the output current $I_{o2}$ of the second stage converter 21. Moreover, according to the sampling results of the output current $I_{o2}$ and the input voltage $V_{in}$, a first reference voltage $V_{ref}$ corresponding to the intermediate voltage $V_{mid}$ is generated by the sampling circuit 220. The mode-selecting circuit 221 is electrically coupled with the output terminal of the first stage converter 20 and the sampling circuit 220. Moreover, the mode-selecting circuit 221 receives the first reference voltage $V_{ref}$ and determines the load condition of the load 12 according to the first reference voltage $V_{ref}$. According to the load condition, the mode-selecting circuit 221 generates a first control signal 51 to adjust a working mode of the first stage converter 20. Consequently, the switch elements of the first stage converter 20 are controlled. If the load 12 is in the heavy load condition, the working mode of the first stage converter 20 is set as a continuous working mode. The first stage converter 20 works in a frequency modulation mechanism or a pulse width modulation mechanism. That is, the switching frequency of the first stage converter 20 is adjusted, or the duty ratio of the pulse width modulation signal is adjusted. If the load 12 is in the light load condition, the first stage converter 20 is in a burst mode (see FIG. 11). Moreover, the first control circuit 22 adjusts the intermediate voltage $V_{mid}$ according to the loading amount of the load 12. The procedures of the control method are similar to those mentioned above.

In this embodiment, the power converter 2 further comprises a second control circuit 23. The second control circuit 23 is electrically coupled with the output terminal of the second stage converter 21. The second control circuit 23 samples the output voltage $V_{out}$, and generates a first feedback control signal according to the output voltage $V_{out}$, a second reference voltage $V_{ref2}$ and a feedback compensation impedance Z. Moreover, after the first feedback control signal is compared with a sawtooth wave, the second control circuit 23 generates a second control signal S2 to the second stage converter 21 in order to control the switch elements of the second stage converter 21. For example, the second control circuit 23 comprises a comparator. The first feedback control signal is inputted into the inverted input terminal of the comparator. The sawtooth wave is inputted into the positive input terminal of the comparator. According to the comparing result of the first feedback control signal and the sawtooth wave, the second control signal S2 is generated.

In accordance with the present disclosure, the power converter 2 is controlled by a digital control method or an analog control method.

Figure 14:
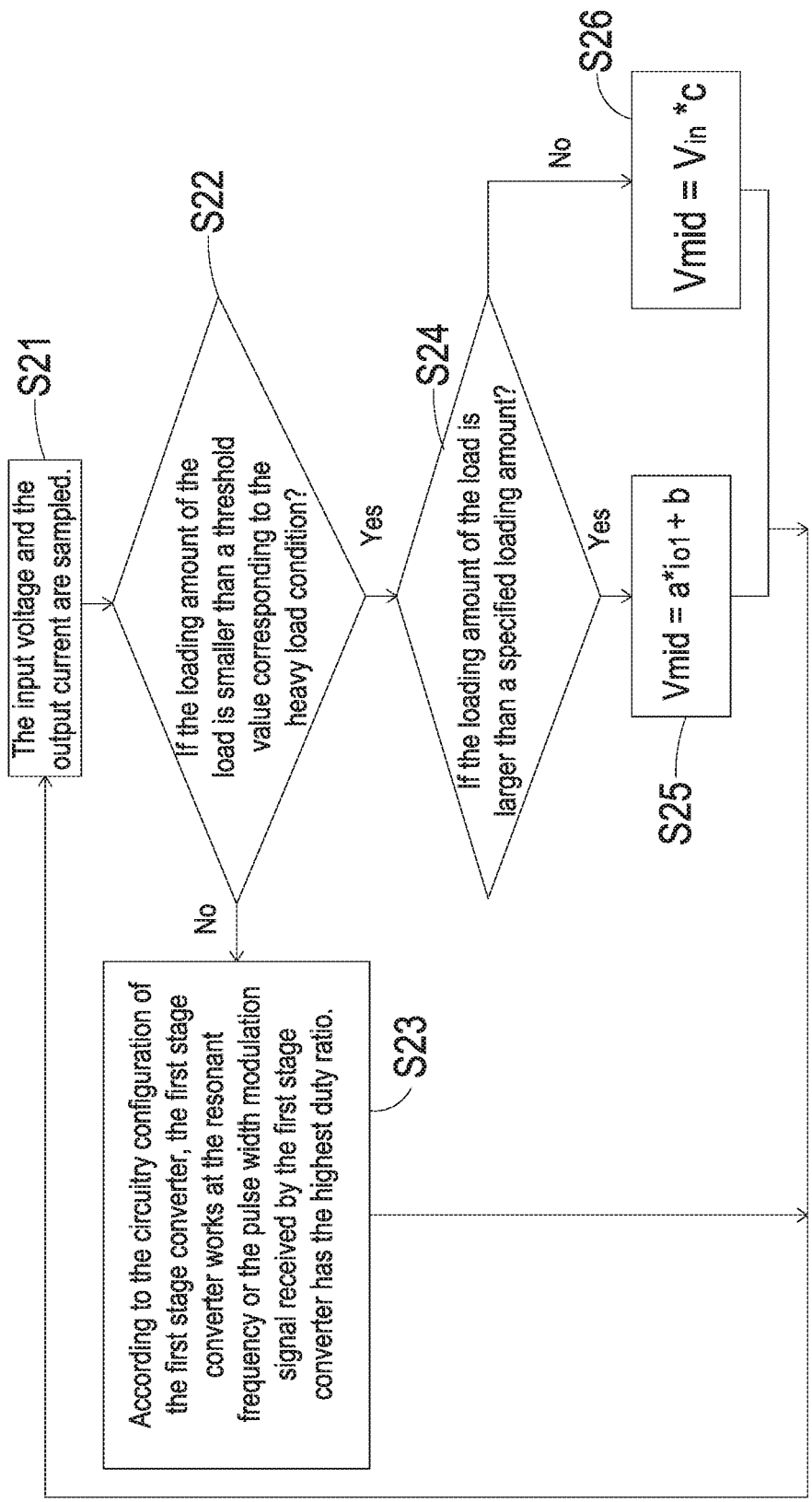
FIG. 14 is a flowchart illustrating a digital control method for the first stage converter of the power converter according to an embodiment of the present disclosure.

FIG. 14 is a flowchart illustrating a digital control method for the first stage converter of the power converter according to an embodiment of the present disclosure. When the first stage converter 20 of the power converter 2 is controlled by the digital control method, the parameters of the power converter 2 are similar to those shown in FIG. 3. In a step S21, the first control circuit 22 samples the signals of the input voltage $V_{in}$ and the signals of the output current $I_{o2}$. Then, the step S22 is performed to determine whether the loading amount of the load 12 is smaller than a threshold value corresponding to the heavy load condition (e.g., the first threshold value) according to the output current $I_{o2}$. If the result of the step S22 indicates that the loading amount of the load 12 is not lower than the first threshold value, the load 12 is in the heavy load condition. Then, the step S23 is performed. That is, the operations of the first stage converter 20 are controlled according to the circuitry configuration of the first stage converter 20. For example, if the first stage converter 20 is a resonant circuit topology, the first stage converter 20 works at the resonant frequency. Moreover, if the first stage converter 20 is a PWM circuit topology, the first stage converter 20 works with the pulse width modulation signal having the maximum duty ratio. Consequently, the converting efficiency of the first stage converter 20 is optimized. After the step S23, the step S21 is repeatedly done.

If the result of the step S22 indicates that the loading amount of the load 12 is lower than the first threshold value, the step S24 is performed to determine whether the loading amount of the load 12 is larger than a specified loading amount according to the output current $I_{o2}$. If the condition of the step S24 is satisfied, the step S25 is performed. In the step S25, the relationship between the loading amount of the load 12 and the intermediate voltage $V_{mid}$ is set as $V_{mid}=a \times i_{o1}+b$, wherein $0<a<1$. The coefficient "b" is determined according to the received input voltage $V_{in}$. Generally, $b=V_{in}/n$, and n is the turn ratio between the primary side and the secondary side of a transformer of the first stage converter 10. If the condition of the step S24 is not satisfied, a step S26 is performed. In the step S26, the intermediate voltage $V_{mid}$ is set as $V_{mid}=V_{in} \times c$, wherein c is a positive constant. Moreover, the intermediate voltage $V_{mid}$ is at least 1.1 times the output voltage. After the step S25 or the step S26, the step S21 is repeatedly done. These parameters can be obtained by a look-up table or a calculation according to different input voltages and different load conditions.

Figure 15:
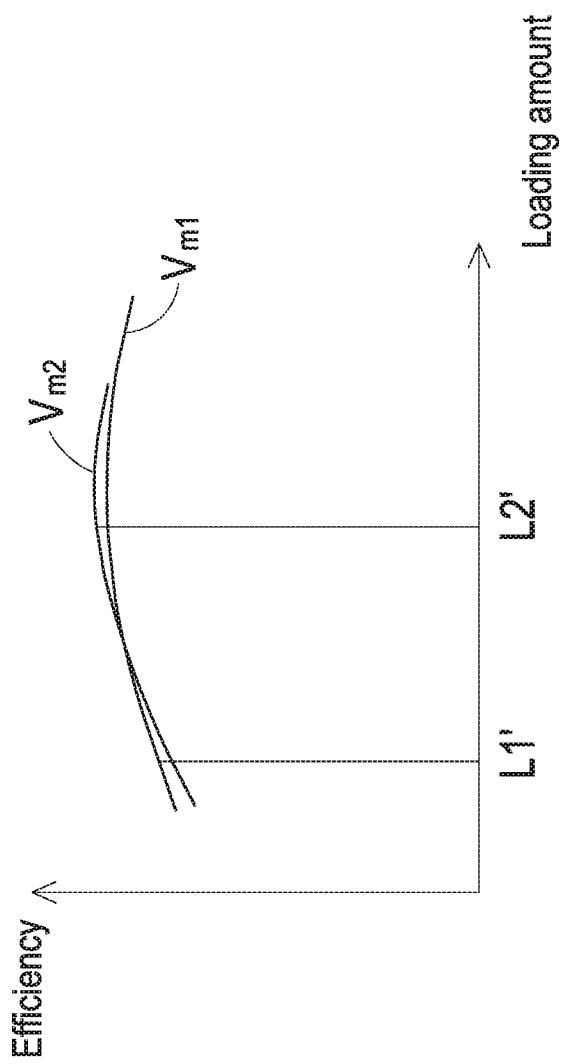
FIG. 15 is a plot illustrating the relationships between the converting efficiency of the power converter and the loading amount of the load.

FIG. 15 is a plot illustrating the relationships between the converting efficiency of the power converter and the loading amount of the load. These relationships are obtained or simulated according to different intermediate voltages. In FIG. 15, $V_{m1}$ and $V_{m2}$ indicate two different intermediate voltages. The relationships between the intermediate voltages and the loading amounts in a desired efficiency range are shown in FIG. 15. For example, in case that the loading amount is $L_{1'}$, the intermediate voltage $V_{m1}$ corresponds to the highest converting efficiency. Moreover, in case that the loading amount is $L_{2'}$, the intermediate voltage $V_{m2}$ corresponds to the highest converting efficiency. The intermediate voltages and the corresponding loading amounts are listed in Table 1.

TABLE 1

| Intermediate voltage | $V_{m1}$ | $V_{m2}$ | . . . |
|---|---|---|---|
| Loading amount | $L_{1'}$ | $L_{2'}$ | . . . |

Similarly, in case that the input voltage is changed, the corresponding efficiency curves can be obtained. According to these efficiency curves, the intermediate voltages and the loading amounts corresponding to another input voltage are also listed in Table 1. Consequently, the parameters corresponding to the input voltage and the output current of the power converter 2 can be obtained by the look-up table.

Moreover, the relationship between the output current and the intermediate voltage can be obtained by a curve fitting method according to the data in the table. For example, the intermediate voltage $V_{mid}$ is expressed as: $V_{mid}=a \times i_{o1}+b$, wherein the coefficients "a" and "b" are obtained by a linear fitting method according to the data in Table 1. Moreover, since the received intermediate voltage $V_{mid}$ of the second stage converter 21 has a lowest limit, the intermediate voltage $V_{mid}$ is at least 1.1 times the output voltage. Consequently, the set value of the intermediate voltage $V_{mid}$ is selected from the maximum one of the first value ($a \times i_{o1}+b$) and the second value $1.1 V_{out}$. In case that the intermediate voltage $V_{mid}$ is always smaller than $1.1 V_{out}$, the segment corresponding to the loading amount smaller than the loading amount L3 is obtained (see FIG. 8). In case that the intermediate voltage $V_{mid}$ is partially larger than $1.1 V_{out}$, the segment corresponding to the loading amount smaller than the loading amount L3 is obtained (see FIG. 6). In case that the intermediate voltage $V_{mid}$ is always larger than $1.1 V_{out}$, the segment corresponding to the loading amount smaller than the loading amount L3 is obtained (see FIG. 7). Moreover, $0<a<1$. The coefficients "a" and "b" may be obtained by curve fitting methods according to Table 1. For example, the curve fitting method includes a quadratic curve fitting method, an exponential curve fitting method or a logarithmic curve fitting method.

Figure 16:
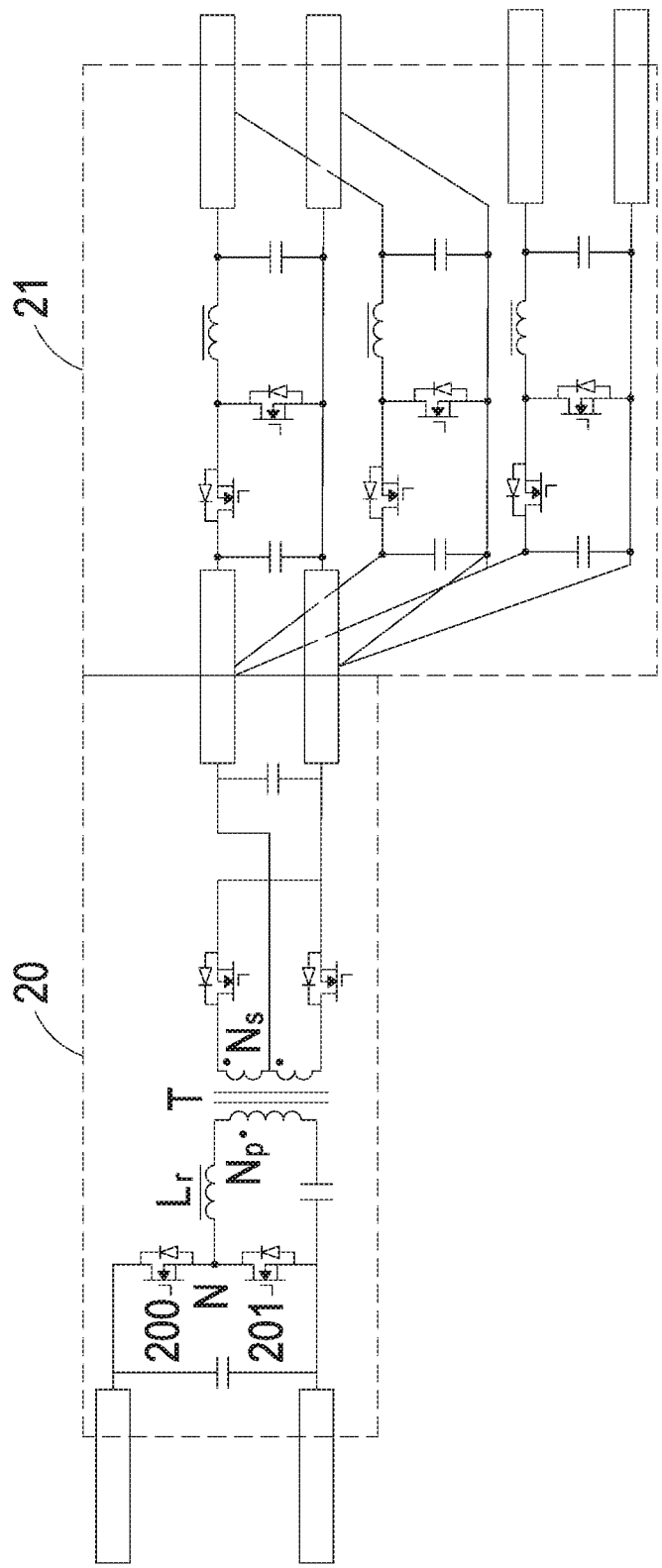
FIG. 16 is a schematic circuit diagram illustrating the detailed circuitry of the first stage converter and the second stage converter of the power converter.

For achieving the optimized converting efficiency, the parameters of the circuitry configuration in the full range should be specially selected by the control method of the present disclosure. FIG. 16 is a schematic circuit diagram illustrating the detailed circuitry of the first stage converter and the second stage converter of the power converter. As shown in FIG. 16, the first stage converter 20 is a DC/DC resonant converter comprising a transformer. The first stage converter 20 is used for converting the input voltage $V_{in}$ (i.e., a higher voltage) into the intermediate voltage (i.e., a lower voltage such as 5V). The first stage converter 20 comprises a first switch 200, a second switch 201, a resonant inductor $L_r$ and a transformer T. The second switch 201 and the first switch 200 are serially connected with a node N. A first terminal of the resonant inductor $L_r$ is electrically connected with the node N. The transformer T comprises a primary winding $N_p$ and a secondary winding N. A terminal of the primary winding $N_p$ is electrically coupled with a second terminal of the resonant inductor $L_r$. The secondary winding $N_s$ is electrically coupled with the input terminal of the second stage converter 21. The second stage converter 21 is a buck circuit for converting the intermediate voltage (e.g., about 5V) into the output voltage to power the load. Since the circuitry of the buck circuit is very simple, multiple buck circuits can be connected with each other in parallel to output large current at a low voltage. For example, as shown in FIG. 16, the second stage converter 21 of the power converter 2 comprises multiple parallel-connected buck circuits.

In case that the second stage converter 21 is a multi-phase interleaved PWM circuit, the full range high converting efficiency can be achieved through the adaptive control method. For example, if the load is in the heavy load condition (e.g., a full load condition), all of the parallel-connected buck circuits (e.g., six phases in parallel) work in a continuous conduction mode (CCM). While the load condition is changed from the heavy load condition to a medium load condition, the parallel-connected buck circuits is switched from the continuous conduction mode (CCM) to a high efficiency discontinuous current boundary mode (DCBM). While the load amount continuously decreases, the number of the buck circuits may be gradually decreased so as to maintain the overall efficiency at the high level. When the load is in the light load condition, and only one buck circuit is left to work, the operation mode may be switched from the discontinuous current boundary mode (DCBM) to the discontinuous current mode (DCM) in order to maintain the desired efficiency. When the load is in a very light load condition, the sole buck circuit must work in a burst mode so that the second-stage converter 21 can maintain the desired efficiency.

That is, the second stage converter 21 composed of multiple parallel-connected buck circuits has a control ability to realize high converting efficiency in the overall range. Moreover, the second stage converter 21 allows for a very wide input range. Consequently, the intermediate voltage received by the second stage converter 21 may be adjusted according to the total highest converting efficiency.

However, it is difficult for the first stage converter 20 to achieve high converting efficiency in the overall range by purely using the control strategy. For example, when the load is in a heavy load condition, the power converter 2 requires the first stage converter 20 have less reactive power component, so as to make all electronic components to transmit the required energy. Consequently, the inductance of the energy storage inductor (PWM circuit) or the resonant inductor (PFM) $L_r$ should be low as possible. For example, the energy storage inductor or the resonant inductor $L_r$ is designed as a DC transformer (DCX). In the light load condition, the resonant inductor $L_r$ is desired to have higher inductance, for storing more reactive power component in order to work at the burst mode and achieve high converting efficiency. Meanwhile, the resonant inductor $L_r$ is desired to have higher inductance for regulating the intermediate voltage in the overall range.

In other words, for achieving high converting efficiency in the overall range, the resonant inductor $L_r$ of the first stage converter 20 should be specially determined. If the inductance of the resonant inductor $L_r$ is too large, the converting efficiency of the first stage converter 20 is poor in the medium load condition or heavy load condition. If the inductance of the resonant inductor $L_r$ is too small, it is difficult to work at the burst mode and thereby restrict the converting efficiency in the light load condition.

Generally, the reactive power adjustment ability of the resonant inductor $L_r$ in the first stage converter 20 can be expressed by a normalized value H, i.e., $H=L_m/L_r$. In this formula, $L_m$ is the inductance value of equivalent parallel-connected inductor of the primary winding $N_p$ of the transformer T, and $L_r$ is the inductance value of equivalent serially-connected inductor (i.e., the resonant inductor) of the primary winding $N_p$ of the transformer T. As the value H increases, the resonant inductance $L_r$ decreases and the reactive power adjustment ability deteriorates. On the contrary, as the value H decreases, the resonant inductance $L_r$ increases and the reactive power adjustment ability optimizes. In an embodiment, the equivalent parallel-connected inductor $L_m$ may be formed by the magnetized inductor of the transformer T and the external inductor in parallel. In another embodiment, the equivalent parallel-connected inductor $L_m$ may be the own magnetized inductor of the transformer T. The inductance value of the own magnetized inductor of the transformer T may be obtained by measuring the inductance value of the primary winding of the transformer T when the secondary side of the transformer T is open-circuited. The equivalent serially-connected inductance $L_r$ may be composed of the external inductance serially connected with the primary winding of the transformed T, the self-leakage inductance of the transformer T, the inductance serially connected with the secondary winding of the transformed T and the parasitic inductance in the resonance loop of the primary-secondary windings of the transformer T. When the secondary side of the transformer T is short-circuited and the inductance of the primary winding of the transformed T is measured, the self-leakage inductance of the transformer T can be measured.

As mentioned above, the lowest value of $L_r$ (corresponding to the highest value of H) is determined when the first stage converter 20 is operated in the burst mode. In the burst mode, the $L_r$ is small enough to assure that the peak current is not too large. The peak current and $L_r$ are related with the operating frequency or the duty ratio in the burst mode, and it is difficult to normalize these parameters. The resonant inductor of the present disclosure is very distinguished from DCX.

Generally, the $L_r$ for DCX may be as low as possible. Consequently, in some conventional designs, H may be 200 or more than 200. In accordance with the present disclosure, the highest H value is 100, which is obviously distinguished from the reactive power adjustment ability of DCX. In some embodiment, the highest H value is 50.

For complying with the converting efficiency requirement in the heavy load condition, the lowest H value is larger than 10. Moreover, in case that $L_r$ is smaller, the volume is reduced while achieving higher power density. In some embodiment, the lowest H value is 20.

In the power converter 2, the value H of the first stage converter 20 with the transformer T may be designed in the range of 10~100, 20~100, 10~50 or 20~50.

In an embodiment, the second stage converter 21 of the power converter 2 is a full-regulation circuit in normal operation, and the first stage converter 20 of the power converter 2 is a non-regulation or semi-regulation DC/DC converter in normal operation. The first stage converter 20 includes an isolated transformer T. In addition, when the load is in the light load condition, the first stage converter 20 works at the burst mode. For example, the intermediate voltage outputted by the first stage converter 20 may be regulated by use of the above-mentioned control method.

In some other embodiments, the second stage converter 21 of the power converter 2 is a multi-phase interleaved PWM circuit, and the first stage converter 20 of the power converter 2 is a resonant circuit.

From the above descriptions, the present disclosure provides the power converter and the control method of the power converter. In accordance with the control method, a received intermediate voltage of the second stage converter may be regulated according to a loading amount of the load. Consequently, the converting efficiency of the second stage converter is optimized in response to the change of the loading amount. Moreover, the operation mode of the first stage converter is controlled to achieve the optimized converting efficiency. Consequently, the power converter may be suitable to satisfy high input voltage and low output voltage and achieve high converting efficiency for various kinds of load amounts.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of controlling a power converter having a first stage converter and a second stage converter, comprising:

converting an input voltage into an intermediate voltage;
    converting the intermediate voltage into an output voltage and providing the output voltage to a load;
    detecting a loading amount of the load;
    if the loading amount of the load is larger than a first threshold value, adjusting the intermediate voltage to increase a voltage difference between the intermediate voltage and the output voltage so that the intermediate voltage has the maximum value at the moment when the load enters a heavy load condition, and a change of the intermediate voltage is in a negative correlation with a change of the loading amount of the load as the loading amount of the load is continuously increased from the heavy load condition; and if the loading amount of the load is smaller than a second threshold value, keeping the intermediate voltage unchanged or adjusting the intermediate voltage, so that the change of the intermediate voltage is in a positive correlation with the change of the loading amount of the load within at least a loading change range, wherein the first threshold value is larger than the second threshold value.

2. The method according to claim 1, wherein the step of detecting the loading amount of the load further comprises:

if the loading amount of the load is larger than the first threshold value, the load is in a heavy load condition; and if the loading amount of the load is smaller than the second threshold value, the load is in a light load condition.

3. The method according to claim 2, wherein if the loading amount of the load is in a range between the first threshold value and the second threshold value, the intermediate voltage is adjusted to increase at a predetermined increase ratio according to the increasing loading amount of the load.

4. The method according to claim 2, wherein the first stage converter works in a pulse width modulation (PWM) mechanism.

5. The method according to claim 4, wherein under the heavy load condition, the first stage converter works with a received PWM signal and has the highest duty ratio.

6. The method according to claim 4, wherein the second stage converter works in a pulse width modulation (PWM) mechanism, when the load is in the light load condition, the intermediate voltage is controlled to be the lowest voltage within the loading change range, and the second stage converter runs at the highest duty ratio.

7. The method according to claim 4, wherein the first stage converter is firstly operated at a predetermined duty ratio to output the intermediate voltage, and then changes the value of the duty ratio and performs differential operation for converting a converting efficiency of the first stage converter, wherein if the converting efficiency of the first stage converter is higher than a predetermined reference value, the value of the duty ratio is stopped changing, wherein if the converting efficiency of the first stage converter is lower than the predetermined reference value and a derivative is positive, the duty ratio is increased and the first stage converter is operated at the increased duty ratio, wherein if the converting efficiency of the first stage converter is lower than the predetermined reference value and a derivative is negative, the duty ratio is decreased and the first stage converter is operated at the decreased duty ratio.

8. The method according to claim 4, wherein if the load is in the light load condition, and the intermediate voltage reaches a lower limit threshold, a pulse width modulation signal is provided to the first stage converter, wherein if the load is in the light load condition, and the intermediate voltage reaches an upper limit threshold, the pulse width modulation signal is stopped providing to the first stage converter.

9. The method according to claim 1, wherein if the load is in the light load condition, the first stage converter is controlled to work according to a predetermined trajectory so as to adjust the intermediate voltage, wherein the predetermined trajectory is used to configure plural predetermined voltage-current trajectories of active components and passive components of the first stage converter.

10. The method according to claim 1, wherein the first stage converter works in a frequency modulation mechanism.

11. The method according to claim 10, wherein if the load is in the heavy load condition, the first stage converter works at a resonant frequency.

12. The method according to claim 10, wherein the first stage converter is firstly operated at a predetermined frequency to output the intermediate voltage, and then changes the value of a switching frequency and performs differential operation for converting a converting efficiency of the first stage converter, wherein if the converting efficiency of the first stage converter is higher than a predetermined reference value, the value of the frequency is stopped changing, wherein if the converting efficiency of the first stage converter is lower than the predetermined reference value and a derivative is positive, the switching frequency is increased and the first stage converter is operated at the increased switching frequency, wherein if the converting efficiency of the first stage converter is lower than the predetermined reference value and the derivative is negative, the switching frequency is decreased and the first stage converter is operated at the decreased switching frequency.

13. The method according to claim 1, wherein if the load is in the heavy load condition, the change of the intermediate voltage and the change of the loading amount of the load are in a negative linear correlation with a slope in a range between −0.2 and 0, wherein if the load is in the light load condition, the change of the intermediate voltage and the change of the loading amount of the load are in a positive linear correlation with a slope in a range between 0 and 1.

14. The method according to claim 1, wherein if the loading amount of the load is larger than a third threshold value and smaller than the second threshold value, the intermediate voltage is adjusted to decrease the voltage difference between the intermediate voltage and the output voltage, and the change of the intermediate voltage is in a positive correlation with a change of the loading amount of the load, wherein if the loading amount of the load is smaller than the third threshold value, the intermediate voltage remains be unchanged or the intermediate voltage is adjusted such that the change of the intermediate voltage is in a positive correlation or negative correlation with the change of the loading amount of the load.

15. A power converter, comprising:

a first stage converter for receiving an input voltage and converting the input voltage into an intermediate voltage;

a second stage converter for receiving and converting the intermediate voltage into an output voltage, and providing the output voltage to a load; and a first control circuit electrically coupled with the first stage converter, comprising:

a sampling circuit, which is electrically coupled with an input terminal of the first stage converter and an output terminal of the second stage converter, and samples signals of the input voltage and signals responding to an output current of the second stage converter, and generates a first reference voltage according to the output current and the input voltage; and a mode-selecting circuit, which receives the first reference voltage, and determines a load condition of the load according to the first reference voltage, and adjusts a working mode of the first stage converter according to the load condition, wherein if a loading amount of the load is larger than a first threshold value, the first control circuit adjusts the intermediate voltage, so that the intermediate voltage has the maximum value at the moment when the load enters a heavy load condition, and a change of the intermediate voltage is in a negative correlation with a change of the loading amount of the load as the loading amount of the load is continuously increased from the heavy load condition.

16. The power converter according to claim 15, wherein if the loading amount of the load is smaller than a second threshold value, the intermediate voltage remains be unchanged or the first control circuit adjusts the intermediate voltage, and the change of the intermediate voltage is in a positive correlation with the change of the loading amount of the load,
wherein if the loading amount of the load is smaller than a third threshold value, the intermediate voltage remains be unchanged or the first control circuit adjusts the intermediate voltage, and the change of the intermediate voltage is in a positive correlation or negative correlation with the change of the loading amount of the load, wherein the first threshold value is larger than the second threshold value, and the second threshold value is larger than the third threshold value.

17. The power converter according to claim 15, further comprising a second control circuit, which samples the output voltage, generates a first feedback control signal according to the output voltage, a second reference voltage and a feedback compensation impedance, and controls the second stage converter according to the first feedback control signal.

18. A power converter, comprising:
a first stage converter for receiving an input voltage and converting the input voltage into an intermediate voltage; and
a second stage converter for receiving and converting the intermediate voltage into an output voltage, and providing the output voltage to a load,
wherein the first stage converter is a resonant DC/DC converter and the resonant DC/DC converter comprises a resonant inductor and a transformer having a primary winding and a secondary winding, and a terminal of the primary winding is electrically coupled with a second terminal of the resonant inductor, $H=Lm/Lr$, wherein Lm is an inductance value of an equivalent inductor of the primary winding of the transformer, Lr is an inductance value of the resonant inductor, and H is in a range between 10 and 100, wherein if a loading amount of the load is larger than a first threshold value, the intermediate voltage is adjusted so that the intermediate voltage has the maximum value at the moment when the load enters a heavy load condition, and a change of the intermediate voltage is in a negative correlation with a change of the loading amount of the load as the loading amount of the load is continuously increased from the heavy load condition.

19. The power converter according to claim 18, further comprising a first control circuit, wherein the first control circuit is electrically coupled with the first stage converter, and comprises:
a sampling circuit for sampling or presetting an output current of the second stage converter; and
a mode-selecting circuit for determining a load condition of the load according to a result of sampling or presetting the output current, and adjusting a working mode of the first stage converter according to the load condition of the load,
wherein if the load is in a heavy load condition, the first stage converter works in a continuous control mode, and if the load is in a light load condition, the first stage converter works in a burst mode.

20. The power converter according to claim 18, wherein H is in a range between 10 and 50.

21. The power converter according to claim 18, wherein H is in a range between 20 and 50.

22. The power converter according to claim 18, wherein H is in a range between 20 and 100.

23. The power converter according to claim 18, wherein H is in a range between 10 and 100.

24. The power converter according to claim 18, wherein the first stage converter is an isolated DC/DC converter having a non-regulation circuit or a semi-regulation circuit, and the second stage converter is a full-regulation circuit.

25. The power converter according to claim 18, wherein the second stage converter is a multi-phase interleaved PWM circuit.

* * * * *